Figure 1:
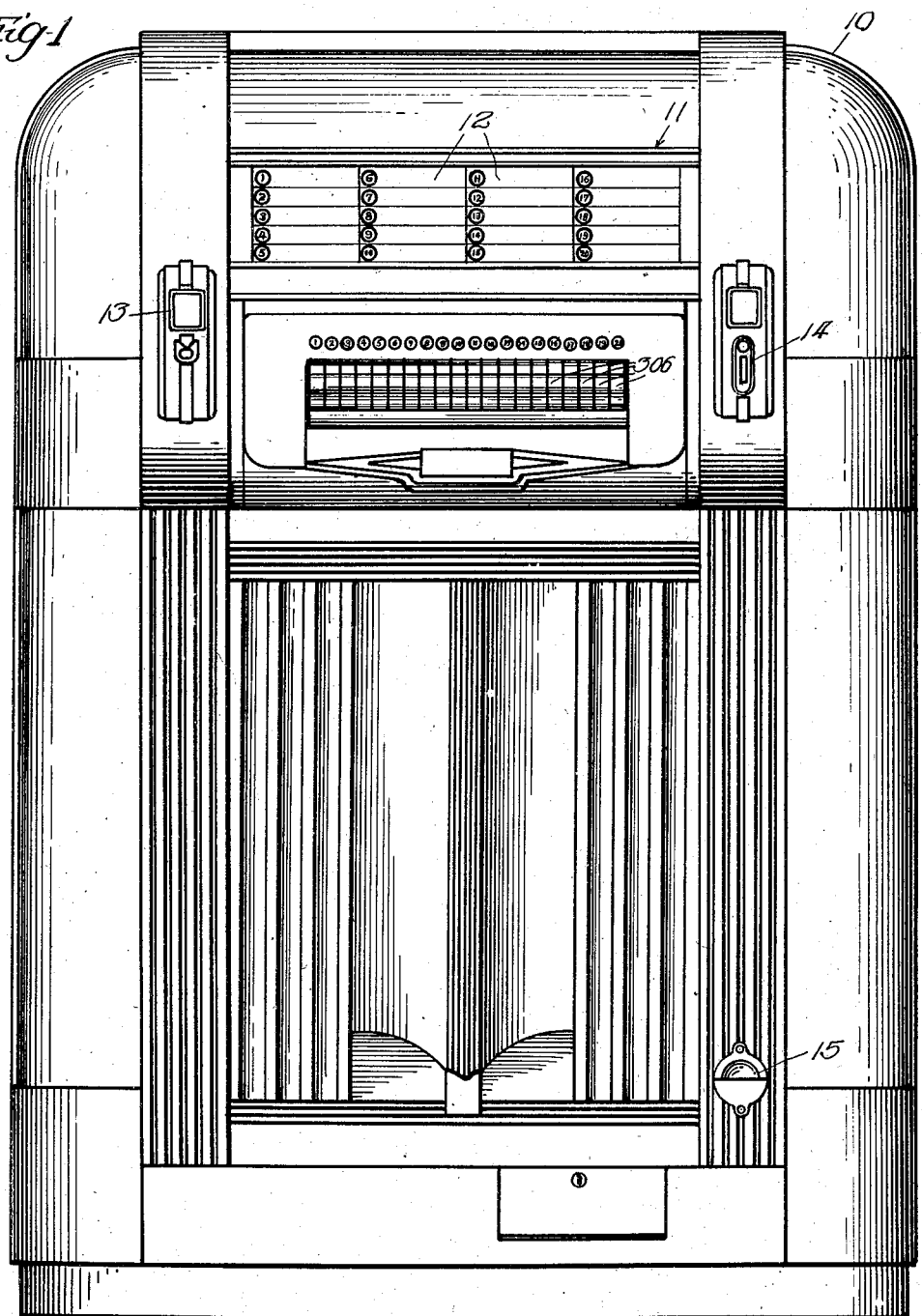

Oct. 24, 1944. L. B. BURNHAM 2,360,847
PHONOGRAPH
Filed Aug. 3, 1940 20 Sheets-Sheet 1

Inventor.
Lawrence B. Burnham.
By:- Atty.

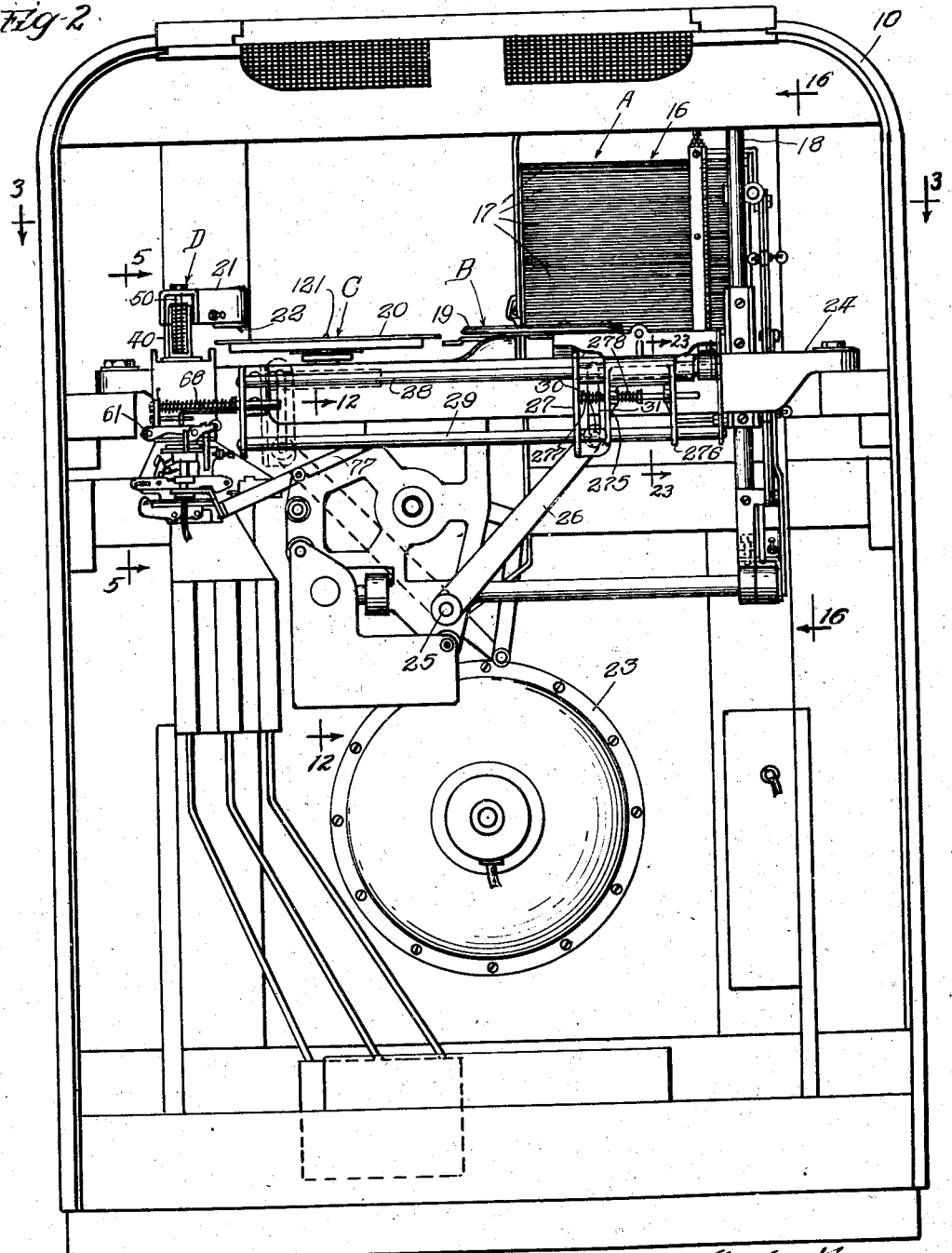

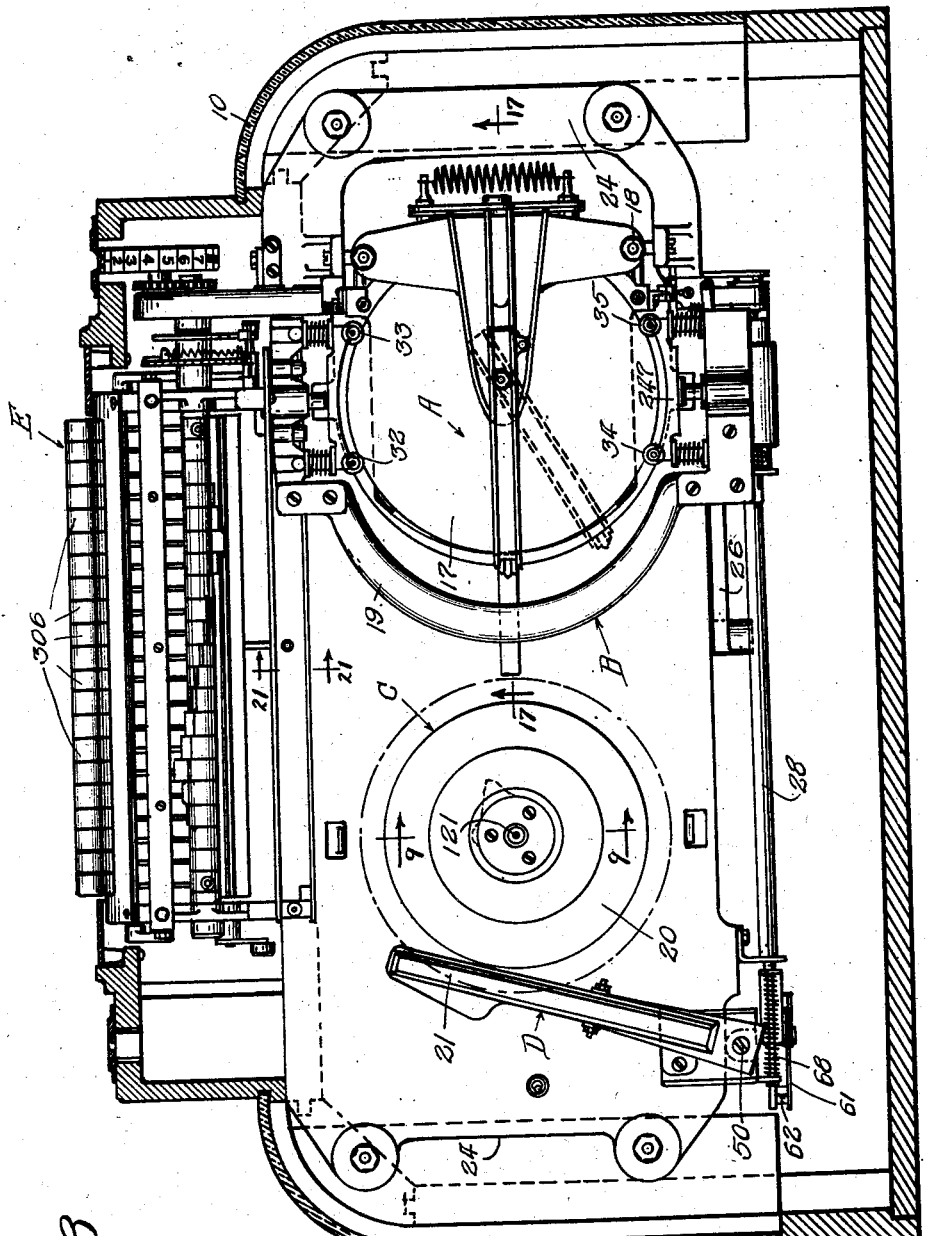

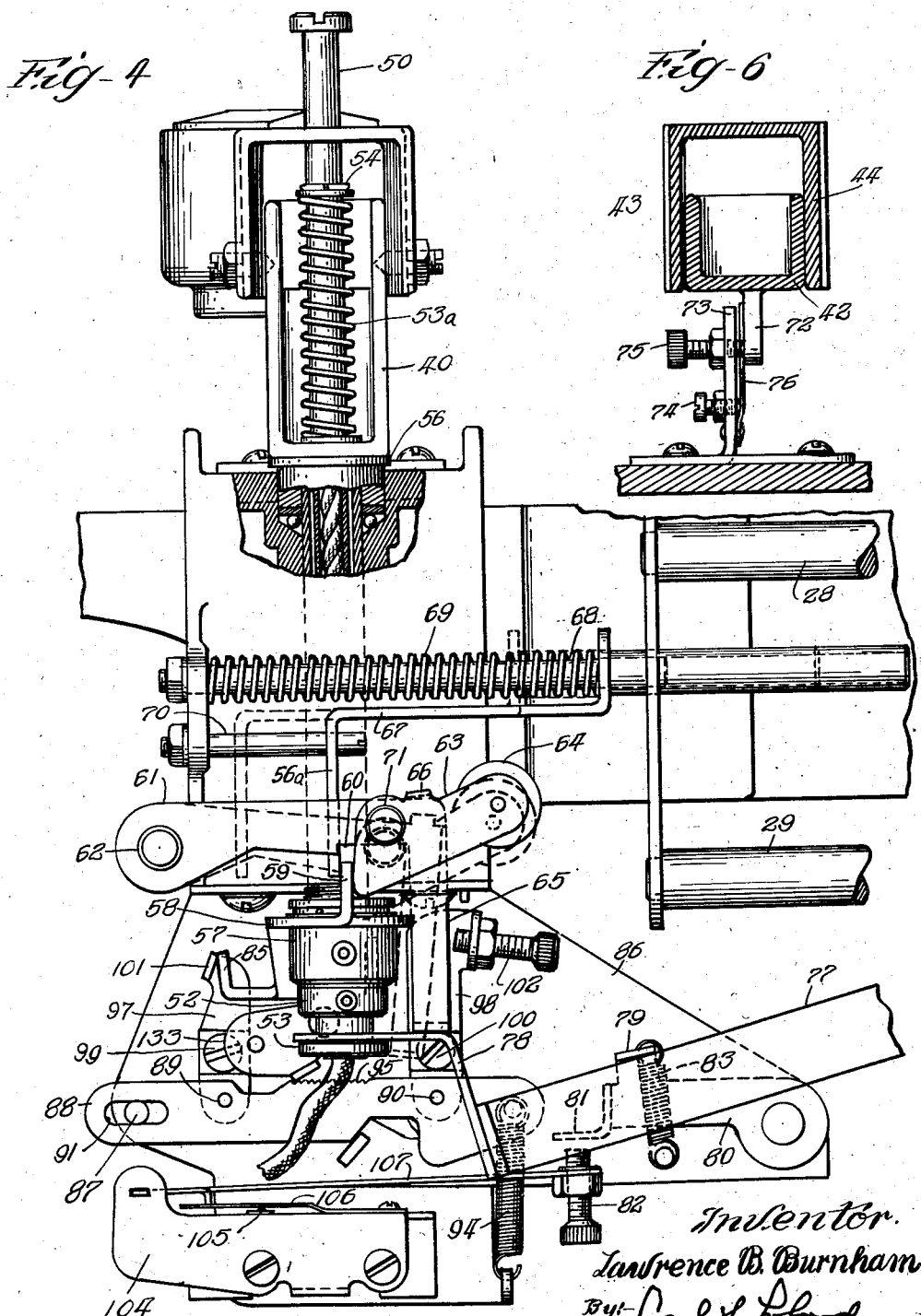

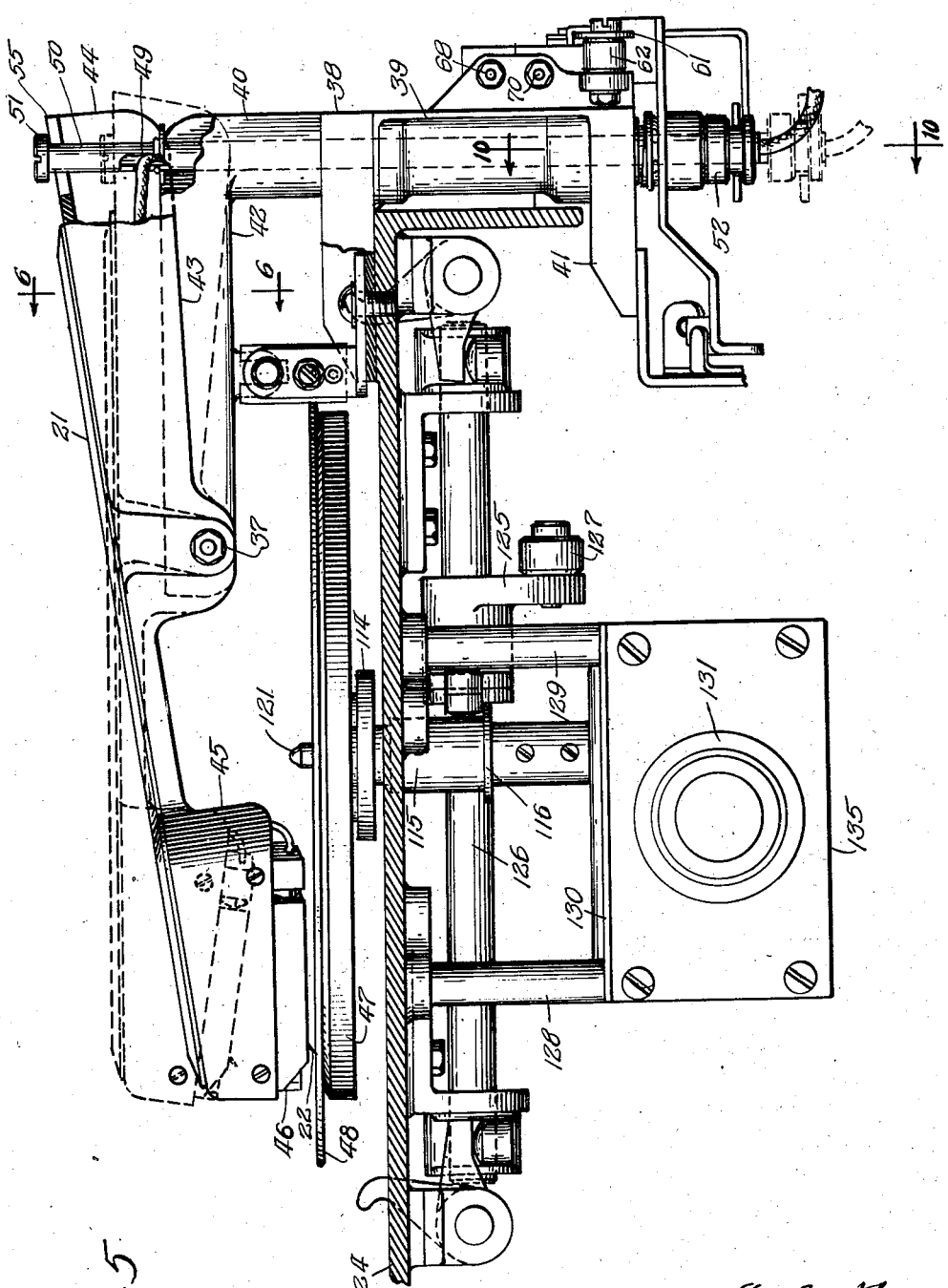

Oct. 24, 1944.　　　L. B. BURNHAM　　　2,360,847
PHONOGRAPH
Filed Aug. 3, 1940　　20 Sheets-Sheet 6
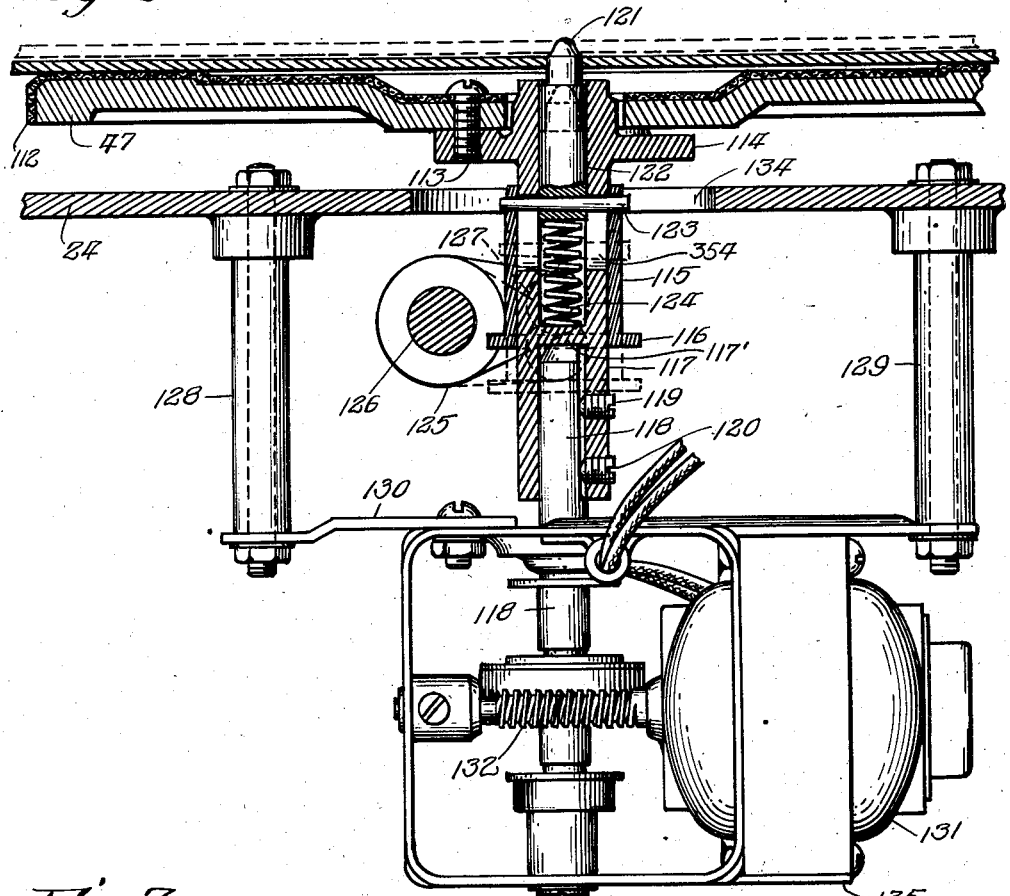
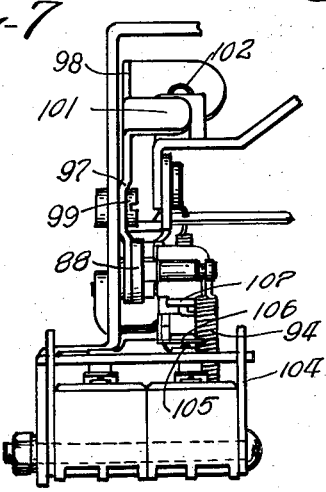
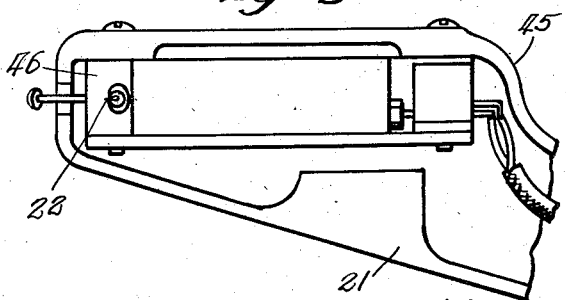
Inventor.
Lawrence B. Burnham.
By: Carl J. Lloyd Atty.

Inventor
Lawrence B. Burnham.
By: [signature]
Atty.

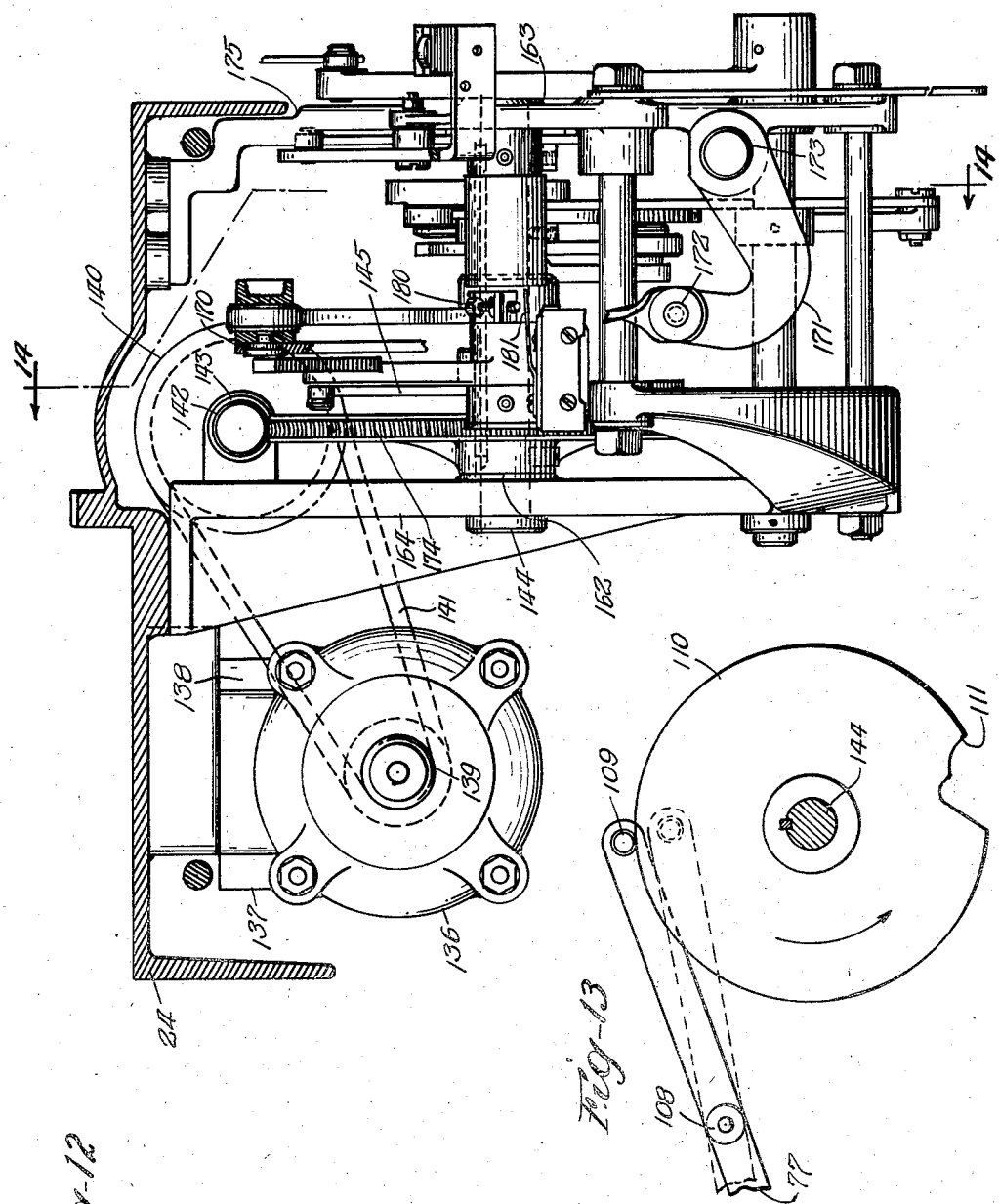

Oct. 24, 1944.  L. B. BURNHAM  2,360,847
PHONOGRAPH
Filed Aug. 3, 1940  20 Sheets-Sheet 9

Inventor.
Lawrence B. Burnham
By:
Atty.

Oct. 24, 1944.   L. B. BURNHAM   2,360,847
PHONOGRAPH
Filed Aug. 3, 1940   20 Sheets-Sheet 11

Inventor:
Lawrence B. Burnham.
By: Carl S. Lloyd
Atty.

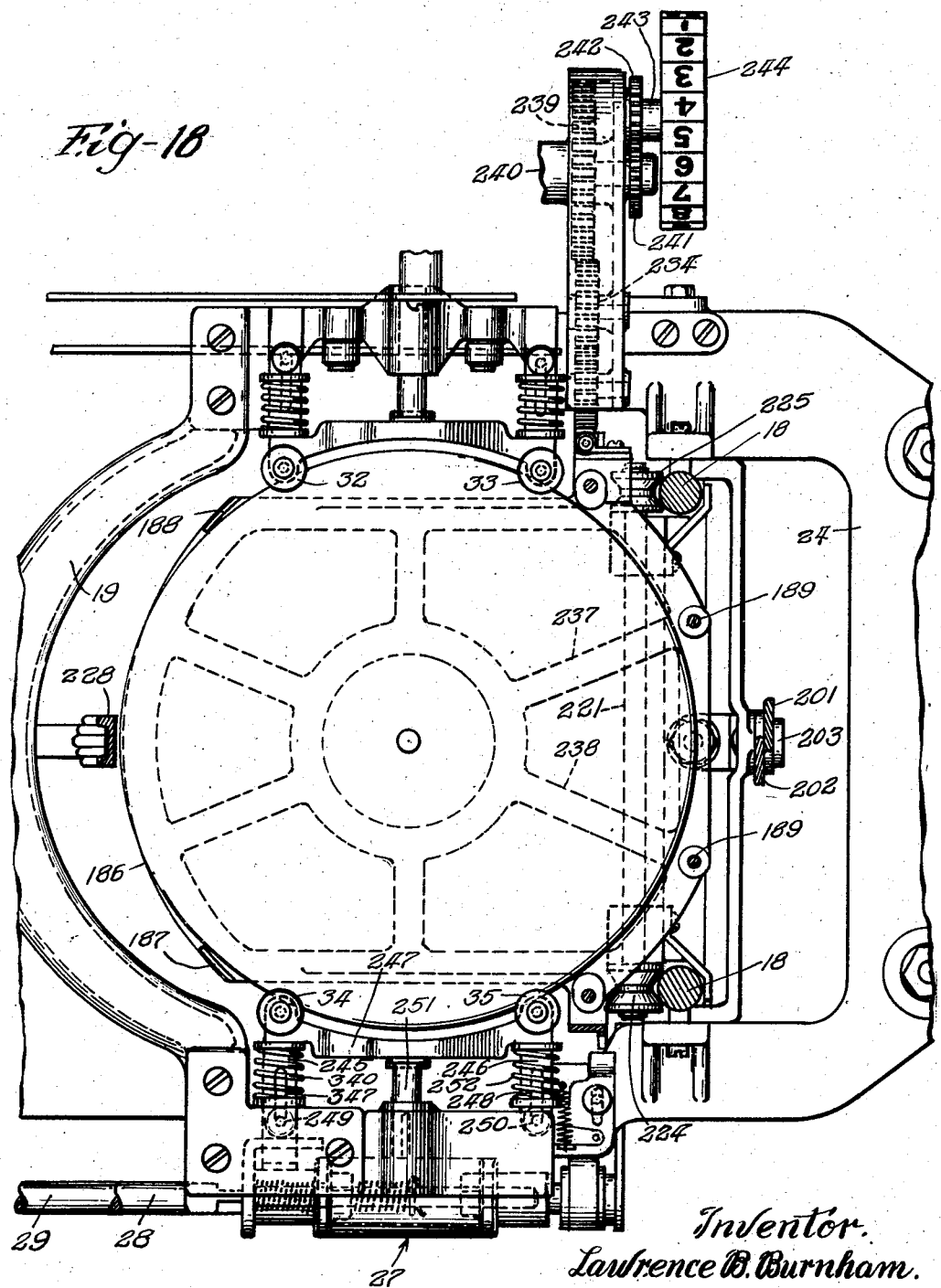

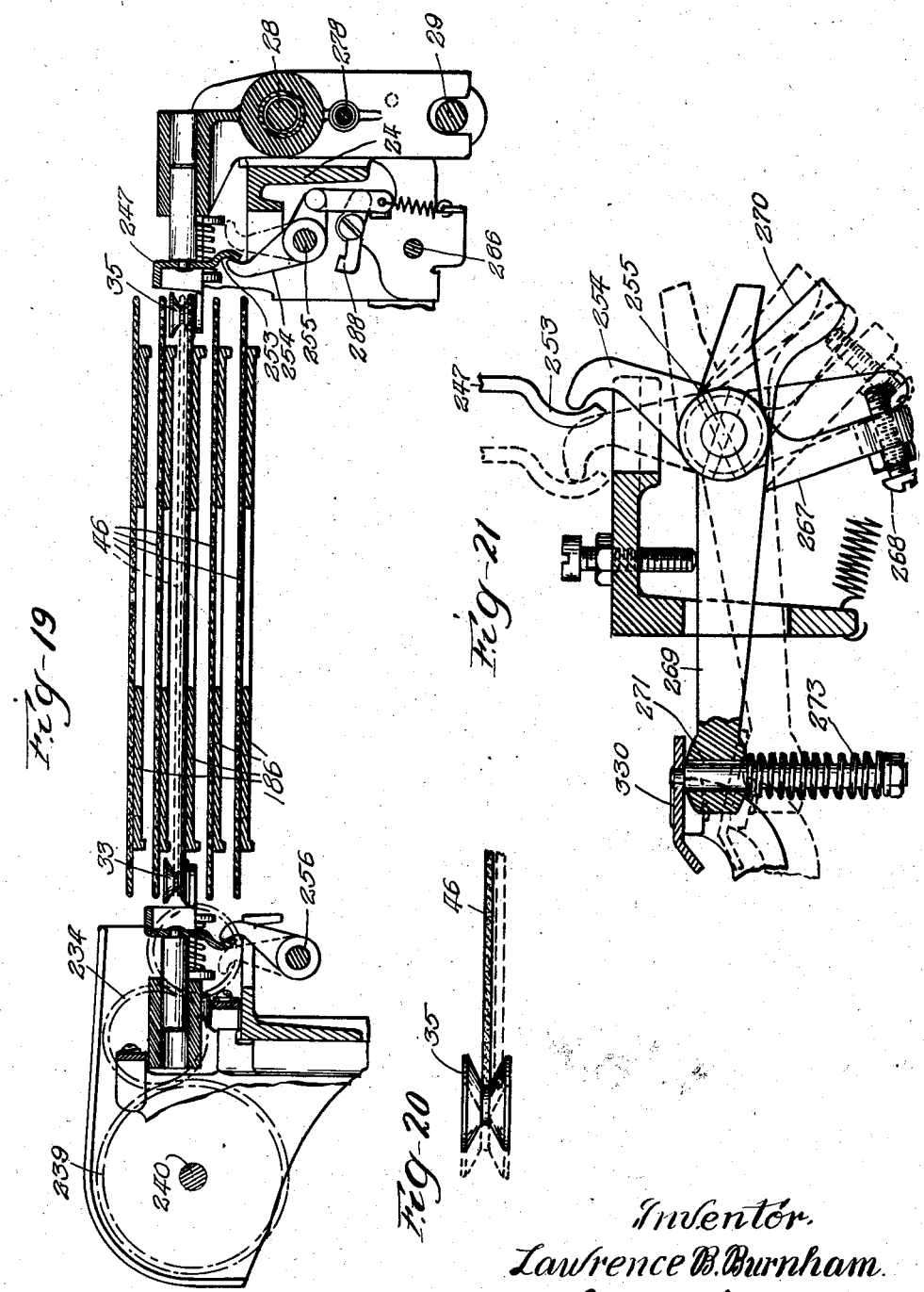

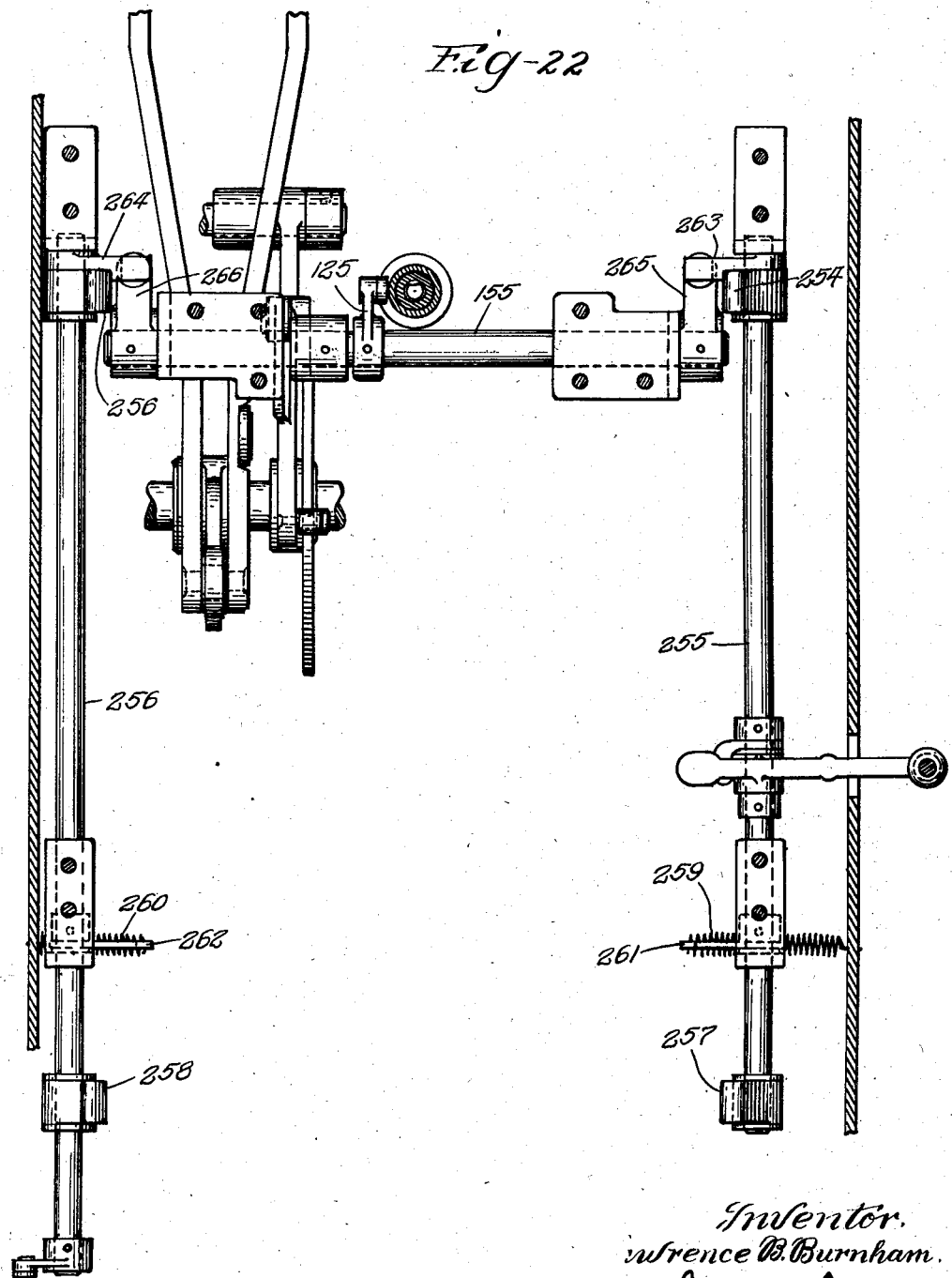

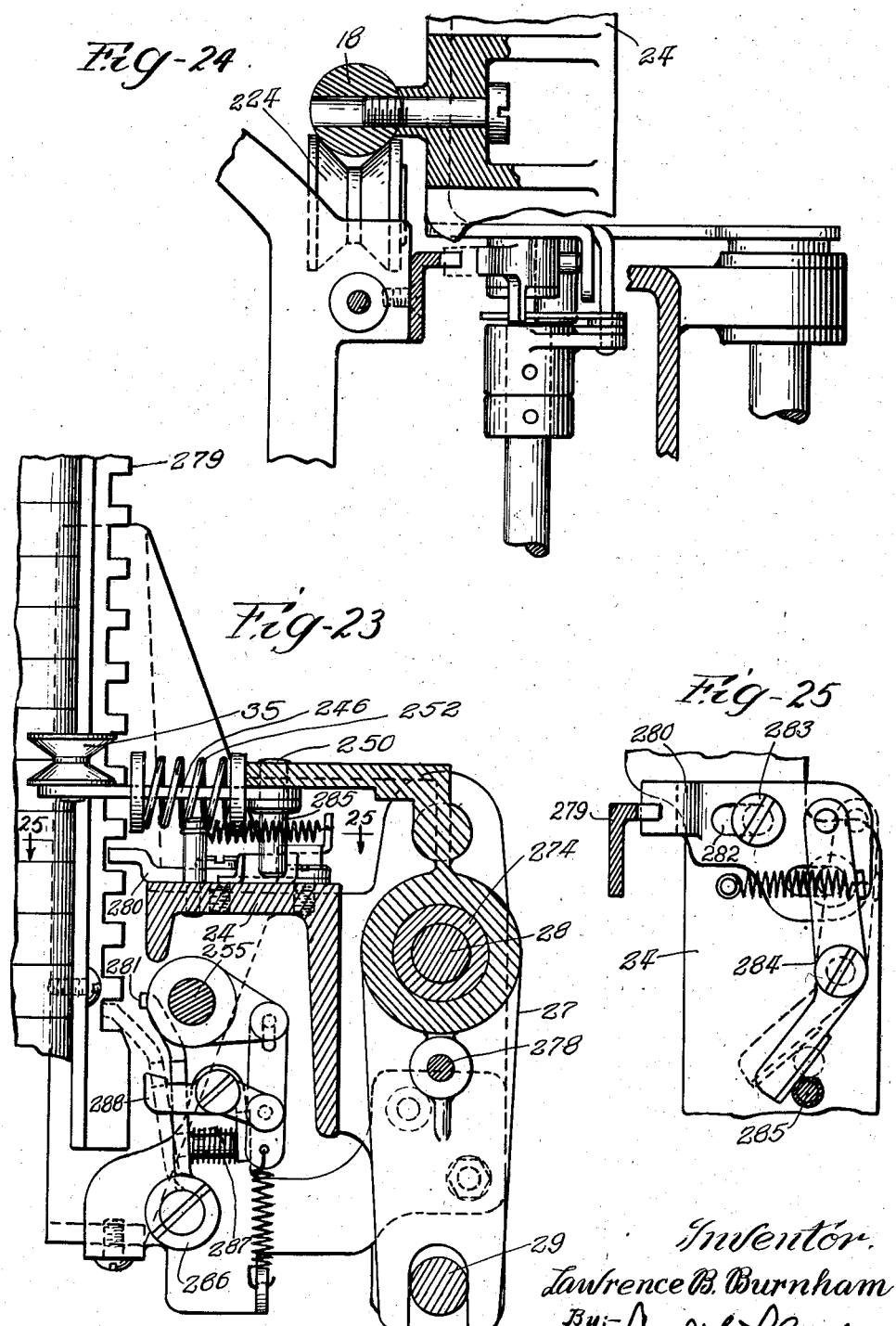

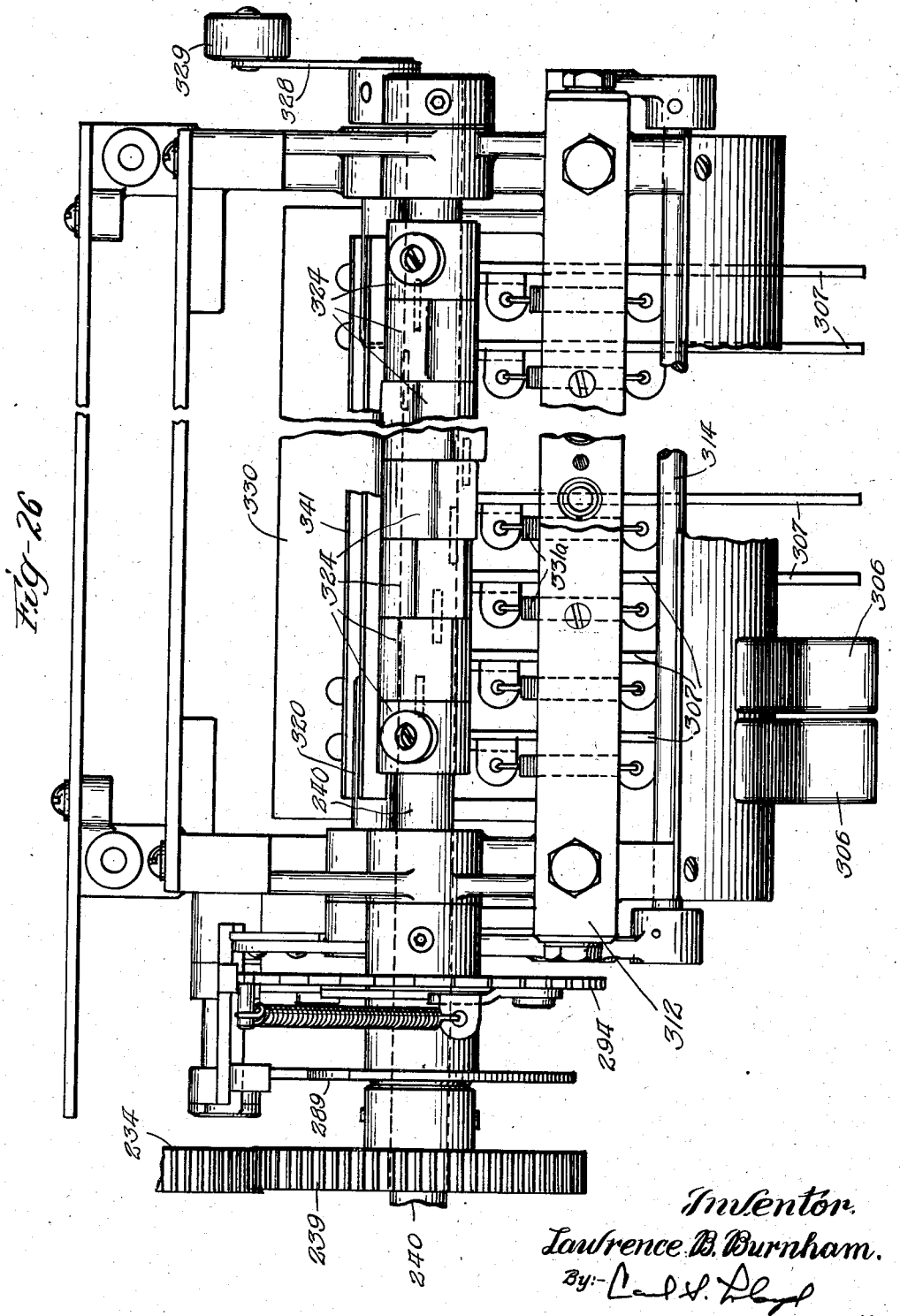

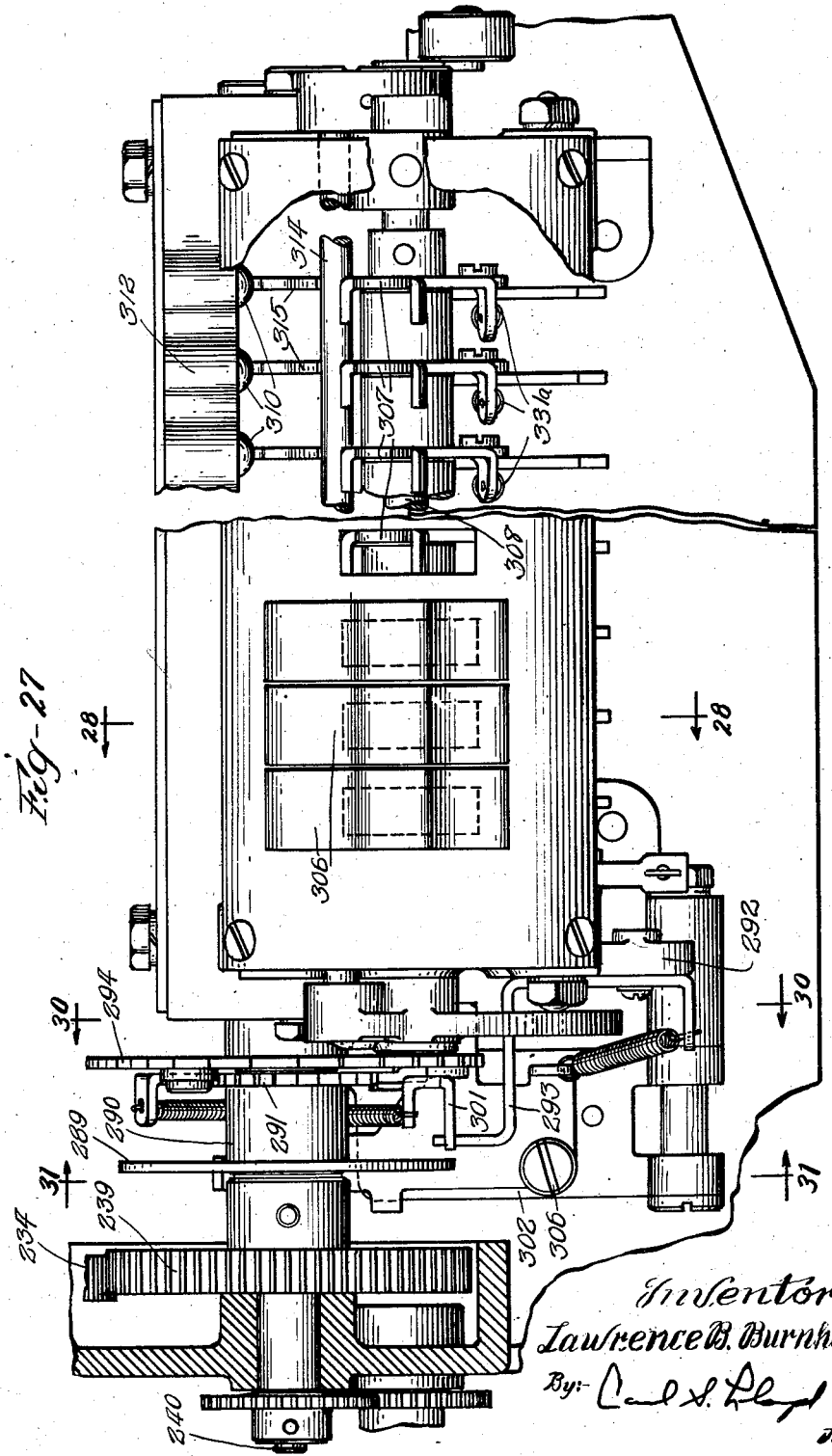

Oct. 24, 1944.  L. B. BURNHAM  2,360,847
PHONOGRAPH
Filed Aug. 3, 1940   20 Sheets-Sheet 18

Inventor.
Lawrence B. Burnham.

Oct. 24, 1944.   L. B. BURNHAM   2,360,847
PHONOGRAPH
Filed Aug. 3, 1940    20 Sheets-Sheet 19
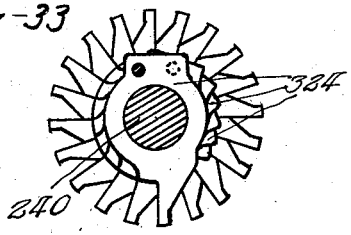
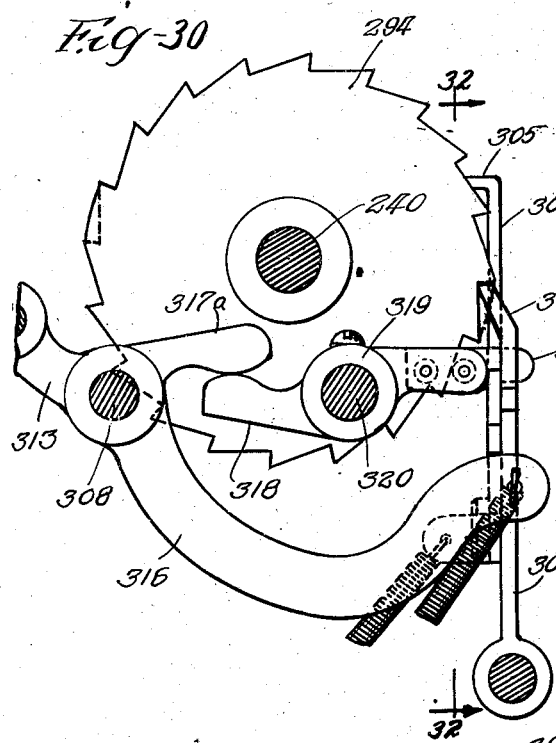
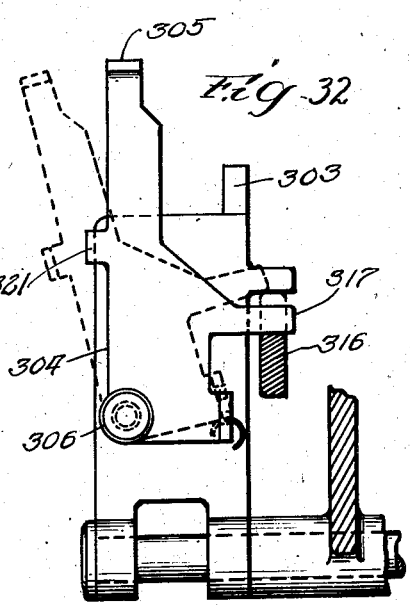
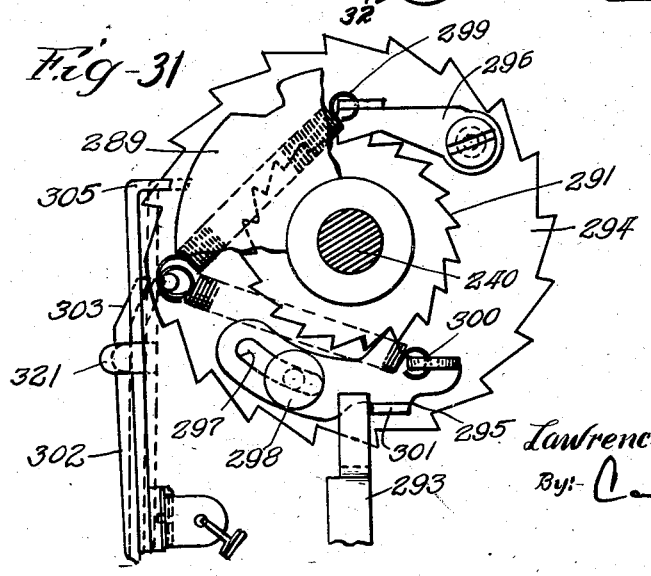
Inventor.
Lawrence B. Burnham.
By:
Atty.

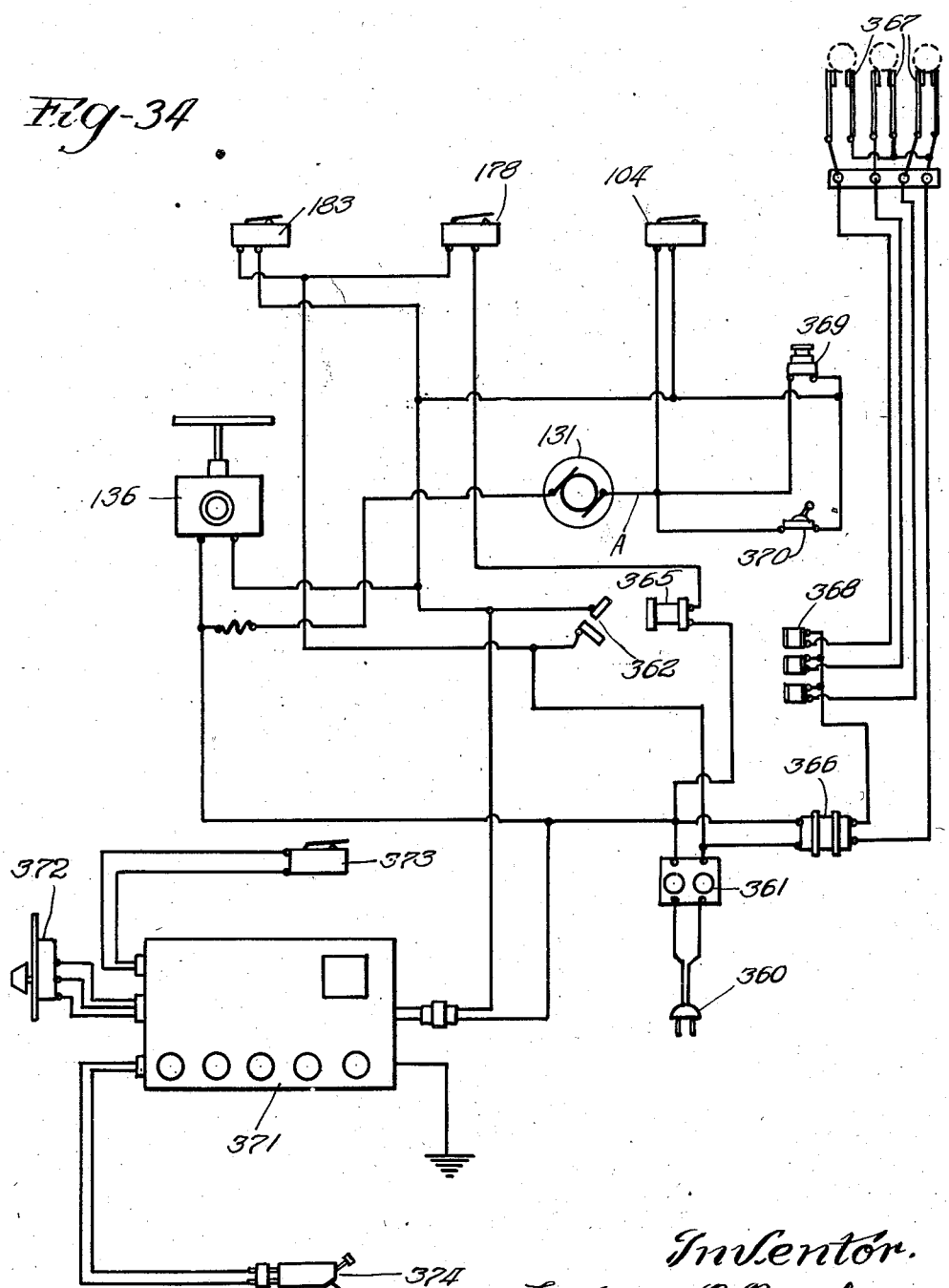

Patented Oct. 24, 1944

2,360,847

UNITED STATES PATENT OFFICE 2,360,847

PHONOGRAPH

Lawrence B. Burnham, Chicago, Ill.

Application August 3, 1940, Serial No. 350,490

18 Claims. (Cl. 274—10)

This invention relates to a phonograph, and more particularly to an automatic phonograph adapted to successively play a plurality of records in a predetermined seqence, and to be selectively operated to play any record chosen by the operator.

An object of the invention is to provide in a phonograph a record changing mechanism and a record playing mechanism, which, although cooperating with each other, are operated independently. Another object is to provide for the successive playing of a plurality of records in a predetermined sequence, and to provide a selector mechanism by means of which any chosen or indicated record may be substituted for one of the records in the sequence. A further object is to provide an improved selector mechanism. Still another object is to provide a movable record magazine, adapted to carry a plurality of records, cooperatively arranged with a record changing mechanism, the magazine being so constructed that all of the records other than the one to be played are locked in the magazine.

Another object of the invention is to provide an improved record changing mechanism in which the records are automatically centered and brought to proper position. A further object is to provide a record playing turntable with a retractable centering pin. Another object is to provide automatic means for stopping the driving motor for the record changing mechanism when the record playing mechanism goes into operation. A further object is to provide means for locking the tone arm mechanism against movement when the record playing mechanism is not in operation. Still another object is to provide means for causing the record changing mechanism to operate as soon as the playing of the record is completed.

Other objects and features of the invention will appear from the following specification and drawings, in which—

Figure 10:
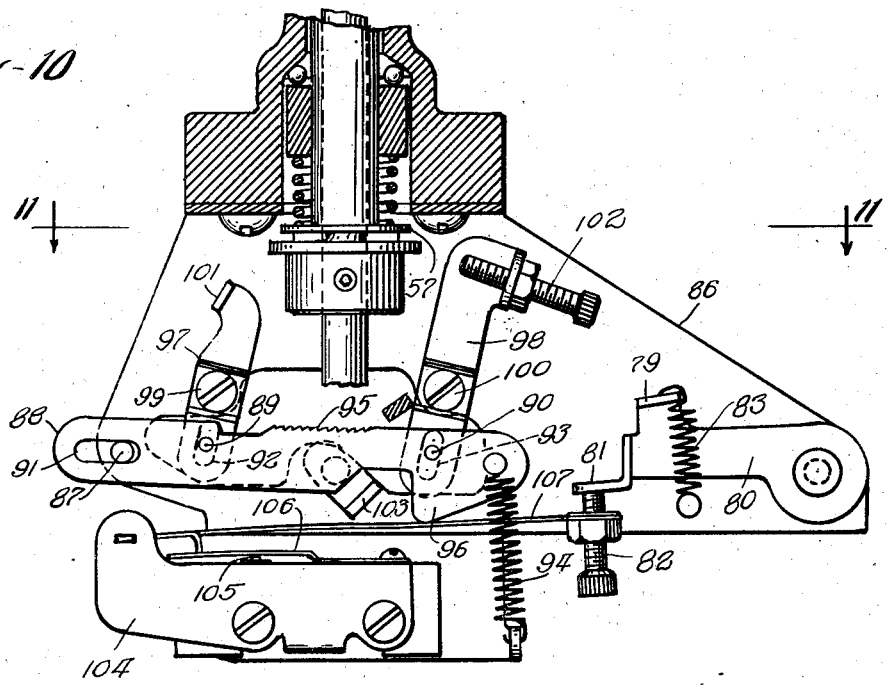
Figure 11:
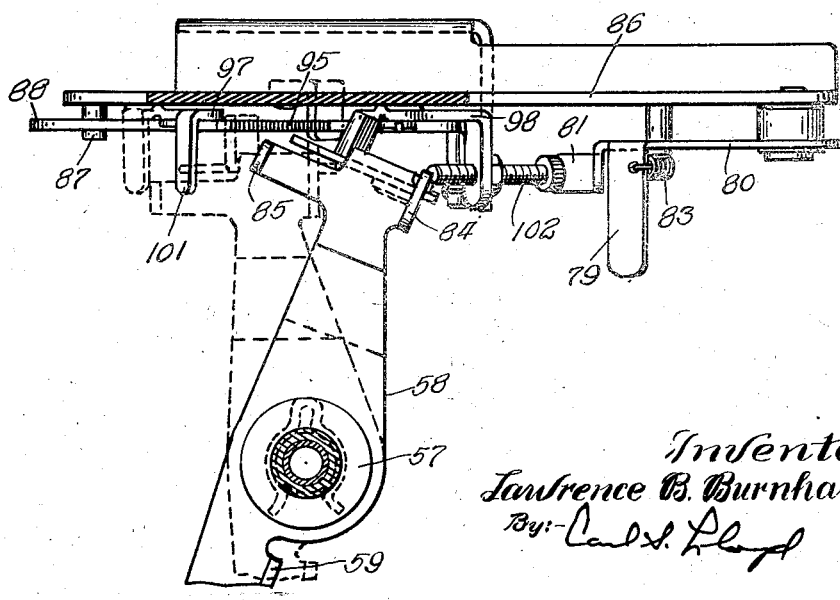
Figure 14:
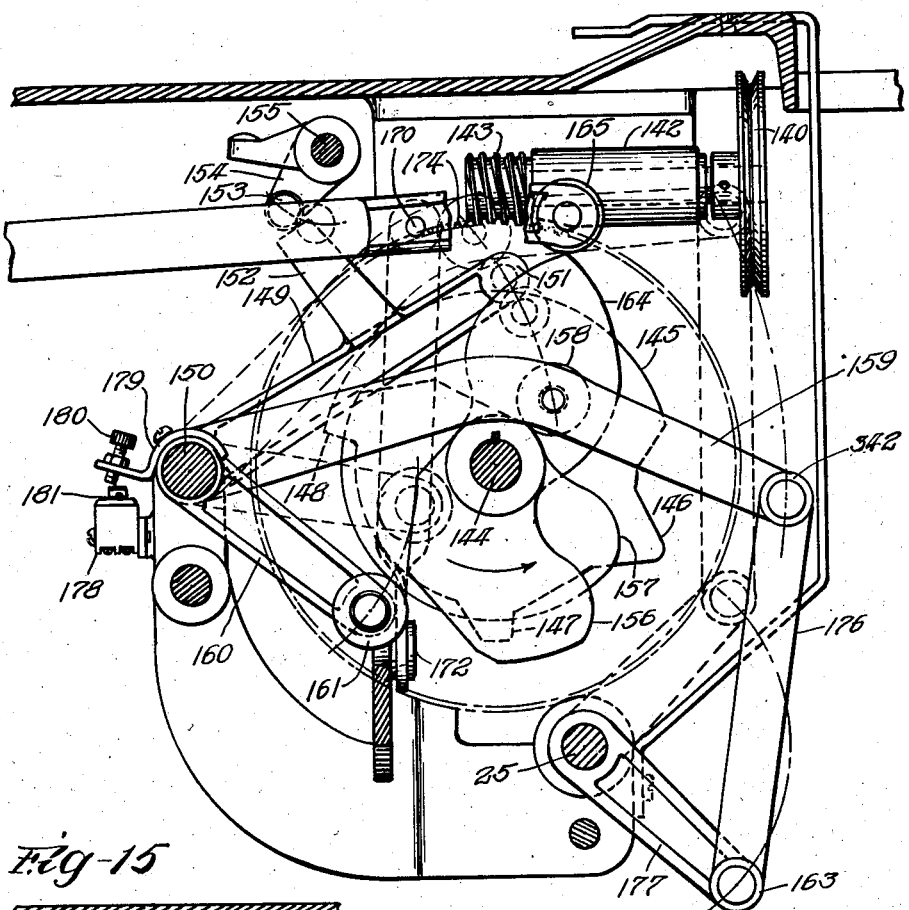
Figure 15:
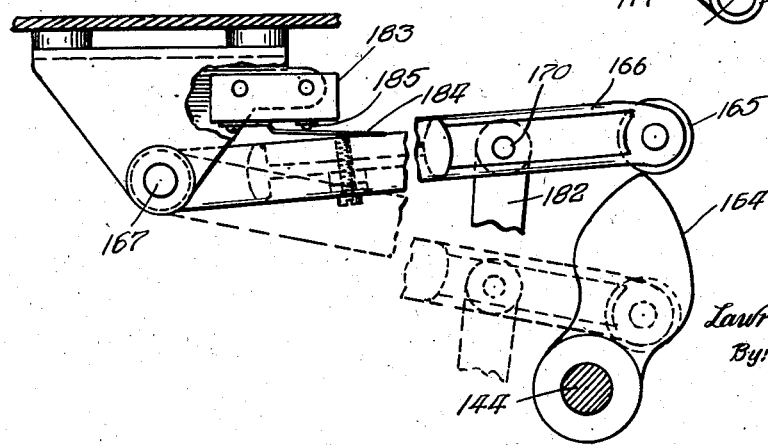
Figure 16:
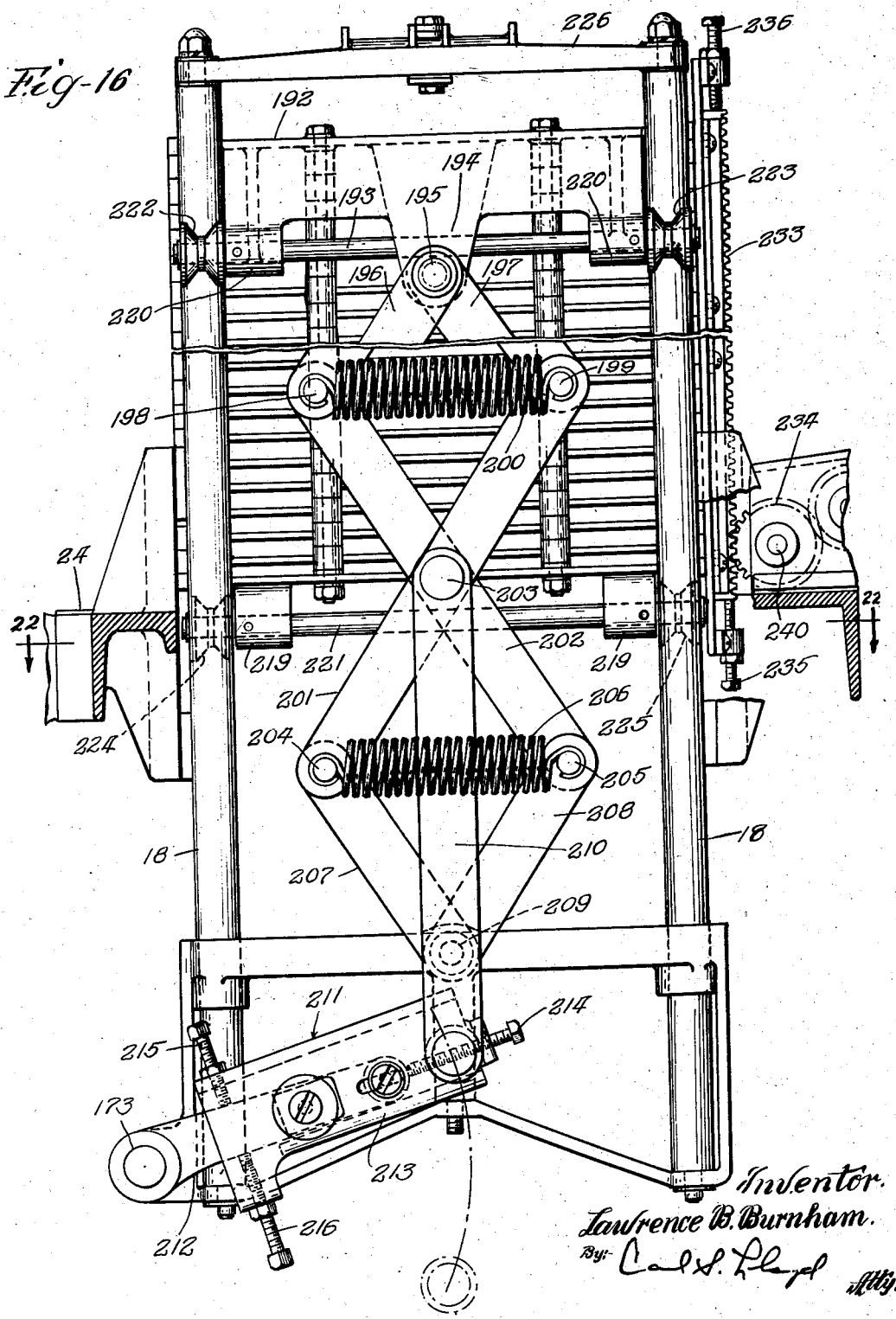
Figure 17:
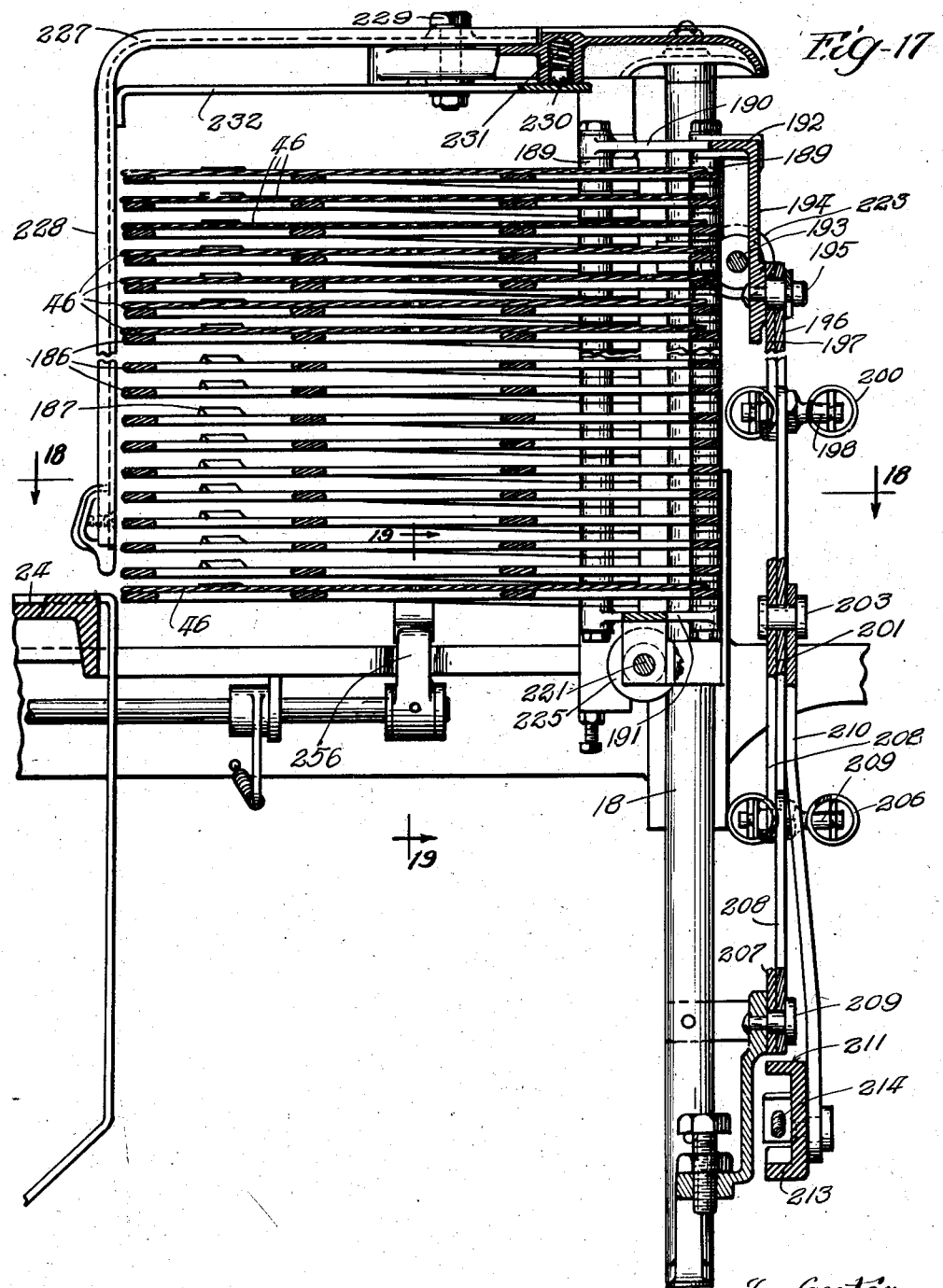
Figure 28:
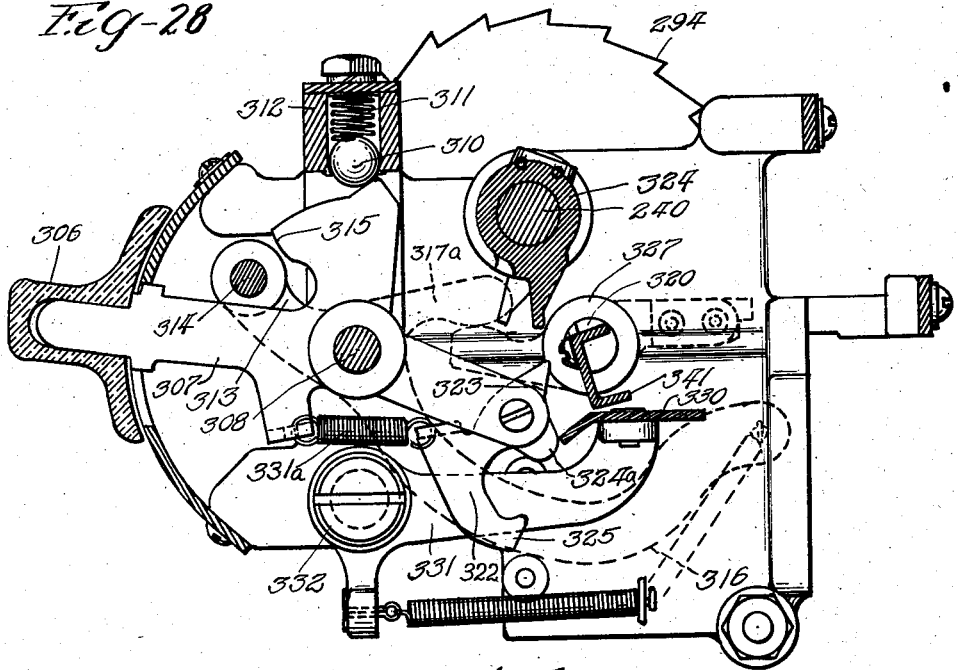
Figure 29:
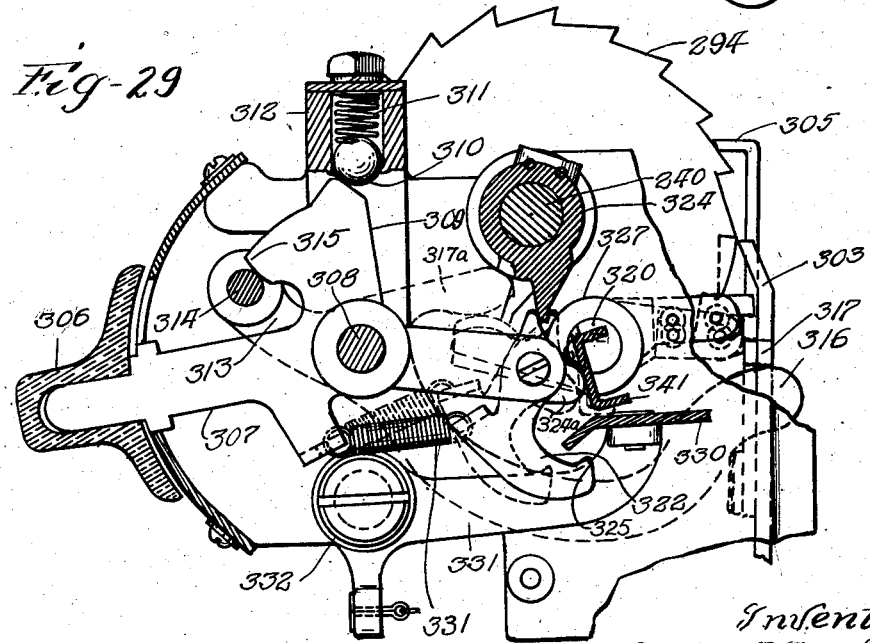

Fig. 1 is a front elevational view of my improved phonograph; Fig. 2 is a similar view of the phonograph, with the outer casing thereof removed; Fig. 3 is a transverse sectional view along the line 3—3 of Fig. 2; Fig. 4 is a side elevational view of the tone arm mechanism with portions thereof cut away; Fig. 5 is a vertical sectional view taken along the line 5—5 of Fig. 2; Fig. 6 is a vertical sectional view taken along the line 6—6 of Fig. 5; Fig. 7 is a fragmentary detail elevational view of the hold-over mechanism on the lower portion of the tone arm; Fig. 8 is a detail plan view of the end of the tone arm with the cover removed; Fig. 9 is a sectional view taken along the line 9—9 of Fig. 3; Fig. 10 is a vertical sectional view along the line 10—10 of Fig. 5; Fig. 11 is a transverse sectional view along the line 11—11 of Fig. 10; Fig. 12 is a sectional view taken along the line 12—12 of Fig. 2; Fig. 13 is a detail elevational view of the cam which moves the tone arm mechanism; Fig. 14 is a sectional view taken along the line 14—14 of Fig. 12; Fig. 15 is an enlarged view of the cam and lever for driving the record magazine, the parts being shown in the same position as in Fig. 14; Fig. 16 is a vertical sectional view taken along the line 16—16 of Fig. 2; Fig. 17 is a vertical sectional view taken along the line 17—17 of Fig. 3; Fig. 18 is a transverse sectional view taken along the line 18—18 of Fig. 17; Fig. 19 is a sectional view taken along the line 19—19 of Fig. 17; Fig. 20 is a fragmentary detail view of the roller and record shown in Fig. 19; Fig. 21 is a sectional view taken along the line 21—21 of Fig. 3; Fig. 22 is a view taken along the line 22—22 of Fig. 16; Fig. 23 is a view taken along the line 23—23 of Fig. 2; Fig. 24 is a fragmentary transverse sectional view showing the locking means for the record magazine; Fig. 25 is a view taken along the line 25—25 of Fig. 23; Fig. 26 is a plan view of the selector mechanism; Fig. 27 is a side elevational view of the same mechanism; Fig. 28 is a sectional view taken along the line 28—28 of Fig. 27; Fig. 29 is a view similar to Fig. 28, showing the selector key in a different position; Fig. 30 is a view taken along the line 30—30 of Fig. 27; Fig. 31 is a view taken along the line 31—31 of Fig. 27; Fig. 32 is a view taken along the line 32—32 of Fig. 30; Fig. 33 is a transverse sectional view of the selector mechanism dogs, taken along the end thereof; and Fig. 34 is a circuit diagram.

The improved phonograph includes a record carrying magazine A, a record changing mechanism B, and a turntable C which receives the records from the record changing mechanism B. A tone arm mechanism D engages the record on the turntable, while a selector mechanism E permits the operator to choose the record to be played.

In the specific embodiment of my invention described herein, and referring particularly to Fig. 1, the phonograph is housed in an outer casing 10 equipped with a large window 11 in the upper portion, in which may be seen a series of cards 12 numbered 1 to 20 and bearing on their face the titles of the records in the phonograph. Through a small window 13 an indicator may be seen which shown the number of the record being played. A coin slot 14 and a coin return 15 are also provided in the casing 10.

Referring to Fig. 2, a magazine 16 carries a plurality of records 17 in vertically stacked relation therein. The magazine 16 is mounted for vertical movement along the guide 18. The arm 19 of the record changing mechanism B is adapted to receive a record from the magazine 16 and deliver it to the turntable C.

While the record to be played is in position on the turntable C, the tone arm mechanism D moves the tone arm 21 downwardly until the needle 22 engages the record. The recording is picked up by the needle 22, converted into sound and amplified in the usual manner, and delivered by the speaker 23 which is of the usual construction.

The upper portion of the casing 10 supports a frame 24 which serves as a base for the major portion of the record changing and the record playing parts of the apparatus. The record changing mechanism B includes an arm 19 which is moved back and forth in a horizontal plane above the frame 24. Rotation of the drive shaft 25 causes the bar 26 attached to the apertured carriage 27 to move along the frame 24.

The carriage 27 is slidably mounted on the rods 28 and 29 and guided in its movement by these rods. The arrangement of a pin 30 in the slot 31 permits vertical movement of the bar 26 with respect to the carriage 27. Thus, oscillating movement of the shaft 25 causes the record changing arm 19 to move back and forth from the magazine 16 to the turntable C.

As seen particularly in Fig. 3, the record changing arm 19 is substantially semi-circular in shape and extends around the magazine 16. The ends of the arm 19 are provided with suitable means, to be hereafter described, for mounting the rollers 32, 33, 34 and 35, which rollers are adapted to grasp the record on the magazine 16 and deliver it to the turntable C.

The tone arm mechanism D, which is shown in detail in Figs. 4, 5, 6, 7, 8, 10, 11 and 13, includes the tone arm 21 (Fig. 5) which is carried above the frame 24 by the supporting member 40 mounted on the channeled plate 38. A depending housing 39 extends downwardly from the plate 38 to a second channelled plate 41. To the plate 41 is secured the hold-over mechanism shown in detail in Fig. 7.

The arm supporting member 40 is provided at its upper end with a lateral extension 42, upon which is pivotally mounted the tone arm 21, the pivot 37 acting as a fulcrum for the tone arm. The tone arm 21 in cross section (Fig. 6) is preferably constructed in the shape of an inverted U, with the side walls 43 and 44 extending downwardly about the arm support 42. On the end of the tone arm 21 a casing 45 carries the reproduction pick-up 46 and the needle 22. A record 48 on the turntable top 47 is engaged by the needle 22, the vibrations of the needle being transmitted through the tone arm by the wire 49.

The wire 49 is connected to a conventional phonographic reproducing mechanism (not shown) for converting the electrical impulses into sound. Since such mechanisms are well known, no further description of the mechanism is included herein.

Extending upwardly through the arm supporting member 40 and the tone arm 21 is a vertically movable rod 50 provided with a head 51. The end of the tone arm contains an aperture 55 sufficiently large to permit movement of the rod 50 therethrough but small enough to provide a stop for the movement of the head 51.

The rod 50 extends through the housing 39 and carries on its lower end a collar 52 providing a limit for upward movement of the rod. Spaced from the collar 52 is an annular flange 53. The rod is shown in raised position in Fig. 4.

Around the upper end of the rod 50 is a spring 53a resting on the support arm 40 and urging the rod upwardly by engagement with the clip 54 attached thereto. The supporting arm 40 is arranged for rotation in the housing 39 by mounting the same in the bearing 56. The lower end of the arm support 40 carries a collar 57 and a horizontal plate 58 provided with an upwardly turned end 59 adapted to be received within the notch 60 of the locking bar 61. Thus when the locking bar 61 is in its lower position as shown in dotted lines in Fig. 4, the arm support 40 (and the tone arm 21) is locked against rotation.

The locking bar 61 is pivotally mounted on the pivot 62 and is attached at its opposite end by the pivot 71 to the arm 63. The depending arm 65 on the same end of the locking bar 61 is provided with a lug 66 which engages the arm 63 and prevents upward movement thereof. The other end of the arm 63 carries the weighted roller 64.

When the arm support 40 is rotated, the end 59 of the plate 58 engages the downwardly turned end 56a of the bar 67 which is slidably mounted on the rod 68 and may be moved against the urging of the spring 69 to the position shown in dotted lines in Fig. 4. The rod 70, extending through the end of the bar 67, serves as a guide for this movement.

The arm support 40 is rotated against the urging of the spring 69 by the movement of the needle 22 and tone arm 21 across the record as it is being played. When the playing of the record is completed and the tone arm lifted therefrom, the spring 69 moves the mechanism back to its original position.

To limit the movement of the tone arm mechanism under the urging of the spring 69, a stop member 73 (Fig. 6) is provided. The arm support 42 is equipped with a depending lug 72 which engages this stop member when the limit of movement is reached. A pair of bolts 74 and 75, threadedly fixed in the stop member 73, provide adjustment for the limitation of movement. The bolt 74 is in contact with a spring steel clip 76 which engages the lug 72 before it reaches the stop member, while the bolt 75 may be adjusted to change the final position of the lug 72. When the lug 72 is in contact with the clip 76 the clip urges the lug and arm support 42 away from the stop member 72.

Referring once more to Fig. 4, the vertical movement of the rod 50 is controlled by the lever 77, which is provided at its end with an apertured arm 78 which encloses the lower portion of the rod. The surface 78 also engages the arm 65. An overhanging lug 79 on the pivotally mounted arm 80 also engages the lever 77.

The arm 80 is provided at its end with a lateral extension 81 adapted to engage the bolt 82 when the arm is moved downwardly by the urging of the spring 83. This latter movement serves to close the circuit of the record changing motor, as will be later described.

In Fig. 8, the end of the tone arm 21 carrying the reproduction pick-up mechanism is shown.

Referring particularly to Figs. 7, 10 and 11, a hold-over mechanism is provided, by means of which the driving motor for the record changing mechanism B is actuated before the tone arm is raised from the record, and the circuit of the driving motor is maintained closed thereafter until the next record is delivered to the turntable and the tone arm 21 again lowered.

The plate 58 on the rod 50 is provided at its end with a pair of opposed lugs 84 and 85, the plate being movable to the position shown in dotted lines in Fig. 11. A frame 86, carried by the channeled member 41, has attached thereto a pin 87 which supports one end of the hold-over bar 88. A pair of pins 89 and 90 are also mounted on the frame 86.

The bar 88 is provided with slots 91, 92 and 93 in which the pins 88, 89 and 90 move. To the end of the bar 88 is attached a spring 94 which urges the bar downwardly, while on the upper surface thereof the bar is equipped with a plurality of teeth 95, upon which the dog 133 (Fig. 4) rides. A downwardly extending projection 96 serves to make and break the electrical circuit when the bar is moved.

The frame 86 also supports a pair of levers 97 and 98 secured thereto by the pivots 99 and 100, respectively. The lever 97 is provided with a transversely extending lug 101, while the lever 98 carries a threaded bolt 102.

The lug 101 and bolt 102, as seen particularly in Fig. 11, engage the opposed lugs of the plate 58, whereby horizontal movement is imparted to the bar 88. Beneath the bar 88 is a pin 103 which engages the recessed lower surface of the bar and thereby controls the vertical movement thereof.

The hold-over mechanism is adapted to operate the switch 104 by lowering the spring clip 106 to depress the button 105. This operation is carried out by moving the bar 107 downwardly as a result of engagement with the projection 96 or by the downward movement of the bolt 82.

As seen in Fig. 13, the lever 77 is pivotally mounted at 108 and is equipped at its end with a roller 109 which engages the periphery of the cam 110. When the roller 109 reaches the recess 111 in the cam 110, the end 78 of the lever 77 is moved upwardly, permitting the spring 53a to raise the rod 50, whereby the tone arm can move to a position of engagement with the record on the turntable.

The turntable mechanism C, as seen particularly in Fig. 9, includes a table 47, preferably covered with felt 112 or other soft material, and secured by bolts 113 to a rotatable base 114.

To the lower portion of the base 114 is attached a cylindrical housing 115 having at its lower end an annular flange 116. The housing encloses a shaft 117, which is integral with the base 114 and is hollow in its lower end and receives in the recess therein the shaft 118. Screws 119 and 120 provide a fixed connection between the shafts 117 and 118.

The shaft 117 is provided with a vertical slot 354 in the central portion thereof. This permits the pin 123 and housing 115 to move vertically with respect to the shaft when the centering pin 121 of the turntable is being raised and lowered. The reduced end 121 of a shaft 122 in alignment with the shaft 118 provides a centering pin which is maintained in fixed vertical relation with respect to the housing 115 by the transverse pin 123. A spring 124 extending between the lower end of the shaft 122 and a partition 117¹ in the hollow shaft 117 continuously urges the housing 115 and centering pin upwardly. Adjacent the housing 115 is an arm 125 fixedly mounted on the shaft 126, and carrying on its end a roller 127, shown in dotted line in Fig. 9.

The entire rotatable portion of the turntable assembly (Fig. 9) extends through an aperture 134 in the frame 24.

The frame 24 supports posts 128 and 129, upon which is mounted the supporting member 130 for the driving mechanism for the shaft 118. A synchronous motor 131, carried by a strap 135 depending from the support 130, drives a worm gear 132 which in the conventional manner rotates the shaft 118 at a substantially constant speed.

The turntable assembly is thus provided with a retractable centering pin 121 which is withdrawn beneath the upper surface of the turntable by the lowering of the housing 115 about the shaft 117, the shaft housing 115 being lowered by the action of the arm 125 on the shaft 126. This retracting means is synchronized with means for moving the record changing arm 19 whereby the pin 121 is withdrawn when the arm 19 is about to move a record across the surface of the turntable. The means for moving the record changing arm will be hereinafter described.

The power means and mechanism for driving the magazine and record changer are shown particularly in Figs. 12, 14 and 15.

An electric motor 136 of any suitable type is mounted on the frame 24 by means of supports 137 and 138. The motor carries a small pulley 139 which is joined to a larger pulley 140 by a V-shaped belt 141. The pulley 140 drives a shaft 142 carrying at its end a worm gear 143, which in turn engages and drives the large gear 174 fixedly mounted on the shaft 144. The shaft 144 is mounted in bearings 162 and 163 carried by depending frame members 164 and 175 on the frame 24.

On the main drive shaft 144 are mounted a series of cams. The cam 145, which is provided with a pair of spaced projections 146 and 147 and a raised portion 148 opposite thereto, actuates the retractable means for the record changing mechanism as well as a releasing bar in the selector mechanism. The projection 146 extends farthest from the shaft 144 and operates the releasing bar. This cam engages a roller 151 on a lever 149 rotatably mounted on the shaft 150. An upwardly extending portion 152 of the lever 149 engages the roller 153 of the arm 154 mounted on the shaft 155.

On the same shaft 144 is mounted a pair of irregular cams 156 and 157. The roller 158 on the lever 159, rotatably mounted on the shaft 150, is engaged by the cam 157, while a lever 160, secured to the lever 159 on the shaft 150, is provided with a roller 161 which engages the cam 156. The cam 156 serves to move the lever 160 downwardly, while in another portion of the cycle of rotation the lever 159 is moved upwardly by the cam 157. In this manner, it is possible to provide for positive downward as well as upward movement of the lever 159.

The lever 159 is joined by the pivot 342 to a link 176, which in turn is pivotally connected at 163 to the lever 177 on the shaft 25 (Fig. 14).

Movement of the lever 159 also serves to open and close the switch 178. A strap 179 is attached to the lever 159 and carries a threaded bolt 180, which depresses the button 181 to close the switch.

A cam 164, shown also in the detail view of Fig. 15, engages a roller 165 on the lever 166, the lever 166 being pivotally mounted on the shaft 167. The vertical bar 182 is attached to the lever 168 by the rivet 170. The movement of the cam 164 imparts reciprocal vertical movement to the bar 182.

To the bar 182 is attached by the pivot 172 the curved lever 171 which is carried by the shaft 173. Movement of the shaft 173, as will be later described, serves to move the record magazine.

Movement of the lever 166 controls the opening and closing of a switch 183 since the raising of the bar brings the clip 184 into engagement with the button 185.

The record magazine mechanism A, as seen particularly in Figs. 16 and 17, includes a plurality of vertically spaced shelves 186 of metal or other suitable material. Preferably if these shelves are composed of metal, they are covered with felt or other soft material. Each of the shelves is provided with a pair of upwardly extending projections 187 and 188 along the periphery of the inner side of the shelf. The shelves 186 provide a rack in which the phonograph records may be arranged in vertically stacked relation.

Rods 189, extending vertically through the shelves, serve as a mounting therefor and maintain the shelves in proper spaced relation, the rods in turn being joined together at the upper and lower ends thereof by the support members 190 and 191. The frame member 192 (Fig. 16) is integrally connected to the upper support member 190 and extends downwardly to enclose and support the horizontal rod 193.

The frame member 192 is provided with a depending strap 194, which carries the pivot pins 195, to which are attached a pair of bars 196 and 197. The opposite ends of the bars 196 and 197 are secured to pivot pins 198 and 199, to which are attached the opposite ends of a coil spring 200. The pivot pins 198 and 199, respectively, also serve as a mounting for a pair of cross bars 201 and 202 which are joined by the pivot 203. The opposite ends of these bars are secured to similar pivots 204 and 205 and a coil spring 206.

Another pair of bars 207 and 208 each secured at one end to one of the pivot pins, are joined by a pivot 209. The pivot 203 supports in addition a vertical bar 210, which, at its opposite end, is secured to a connection 211 to the shaft 173 (shown also in Fig. 12). The connection 211 includes an arm 212 mounted on the shaft 173 and a casing 213 extending about the arm.

The arrangement of the cross bars 196, 197, 201, 202, 207 and 208 together with the coil springs 200 and 206 provide spring means for continually urging the magazine upwardly to reduce the gravitational force thereof.

The casing 213 is secured to the bar 210 and is provided with a threaded bolt 214, by means of which the penetration of the arm 212 into the casing may be adjusted. The vertical relation of the casing 213 with respect to the arm 212 may be changed by means of threaded bolts 215 and 216.

Along the rear of the shelves is a pair of guide shafts 18 secured to the frame 192 and the frame 24. The support members 219, at the lower portion of the shelves, and 220 at the upper portions thereof carry the rods 193 and 221. On the ends of these rods are mounted the V-shaped rollers 222, 223, 224 and 225 which engage the guide shafts 18, the rollers 222 and 223 being on one side of the shafts and the rollers 224 and 225 being on the other side of the shafts.

The magazine is provided with locking means for preventing the removal of more than one record at a time. A cross bar 226, carried by the shafts 18, supports a horizontal bar 227, which is turned downwardly at its end to form the depending extension 228. Since this locking means is secured to the fixed shafts 18, it is not movable vertically and permits only the record which will pass between it and the frame 24 to leave the magazine. The bar may be pivoted around the bolt 229 which extends therethrough, in order that the locking means may be released, and, records added to or removed from the magazine.

The ball bearing 230, urged downwardly by the spring 231, fits into an aperture in a lower branch 232 of the bar 227 and tends to restrain it against accidental release from locking position.

A rack 223 is mounted along the side of the magazine and engages the gear 234 which drives the selector mechanism. Threaded bolts 235 and 236 provide for vertical adjustment of the rack and magazine.

The shelves for the records are preferably of an open frame construction, as seen in Fig. 18, the ribs 237 and 238 being so constructed as to join the periphery of the shelf adjacent the rods 189.

The gear 234 meshes with another gear 239 on the shaft 240. The same shaft carries a small gear 241 which meshes with the gear 242 on the shaft 243. An indicator band 244 is mounted on the shaft 243, and may be viewed through the window 13 (Fig. 1) to determine the number of the record being played.

The record changing mechanism B is seen particularly in Figs. 18, 19, 20, 21 and 23 to 25. This mechanism includes the arm 19, the carriage 27 and the V-shaped rollers 32, 33, 34 and 35, as well as means for transporting the mechanism.

The record changing mechanism B includes the V-shaped rollers 32, 33, 34, and 35 which engage a record on the shelf 186 to lift the record therefrom. The rollers 34 and 35 are carried by the carriage 27, the rollers being mounted on the projecting members 245 and 246, which members in turn are joined by the cross bar 247. The members 245 and 246 are provided with slots 347 and 248, which slidably receive the pins 249 and 250.

A shaft 251 extends from the center of the cross bar 247 into the carriage and is slidably received therein. Since the members 245 and 246 are also slidably received within the carriage, this portion of the assembly, including the rollers 34 and 35, may be moved toward the carriage by exertion of pressure in that direction. Springs 340 and 252, however, yieldingly urge the rollers into engagement with the record.

The end of the arm 19 opposite to the carriage 27 is equipped with a similar assembly for carrying the rollers 32 and 33. Since this assembly corresponds to the one already described, it will not be described in detail herein.

Referring now to Fig. 19, the cross bar 247 is provided with a depending extension 253, which is adapted to engage the finger 254 on the shaft 255. Rotation of the shaft 255 in a clockwise direction, as seen in Fig. 19, therefore, will cause the finger 254 to engage the extension 253 to move the cross bar 247 and the rollers attached thereto away from the record against the urging of the springs 252 and 340. A similar finger and extension are brought into engagement by the rotation of the corresponding shaft 256 on the opposite side.

As seen particularly in Fig. 20, the V-shaped construction of the roller 35 causes the record to be gently lifted as it is engaged by the roller. The record in this manner is lifted from the shelf 186 to clear the projections 187 and 188 thereon.

The rollers 32, 33, 34 and 35 are arranged to withdraw a phonograph record from the turntable 20 as well as from the shelf 186 and to return the record to either the shelf or the turntable. The upper surface of the turntable 20 is disposed in substantial alignment with the shelf 186 from which the record is to be withdrawn. The rollers are arranged with the center line of the V-shaped grooves therein above the record on either the turntable or the shelf. At the same time, the lower edge of the groove in each of the rollers is below the lower edge of the record on either the shelf or the turntable.

The shafts 255 and 256, as seen particularly in Fig. 22, actuate the fingers to release the record on the shelf of the magazine from the rollers 32, 33, 34, and 35. At the opposite ends of these shafts 255 and 256 are fixedly mounted another pair of fingers 257 and 258, which, in a similar manner, release the record from the rollers after it has been delivered to the turntable.

A pair of springs 259 and 260 are secured to arms 261 and 262 extending inwardly from the shafts, and thus exert a tension on the shaft normally holding the fingers from engagement with the extensions of the record changing arm and maintaining a tight connection between the shaft and the means for actuating the same.

The shafts 255 and 256 are provided with inwardly extending fingers 263 and 264, respectively, which are engaged by the fingers 265 and 266 on the shaft 155. The shaft 155 in turn is provided with an arm 125 which moves the retractable turntable pin (Fig. 9). Rotation of the shaft 155 thus causes movement of the shafts 255 and 256.

To the shaft 255, as seen in Figs. 21 and 22, is attached a downwardly extending arm 267 carrying an adjustment bolt 268. A lever 269, rotatably mounted on the shaft 255, is provided with an extension 270 which is engaged by the adjustment bolt 268. The other end of the lever 269 is attached to a pin 271 which is secured to the bottom of the release plate 330 of the selector mechanism. If desired, the lever 269 may be slidably mounted on the pin 271 and urged into engagement with the plate by a suitable spring 273.

The carriage 27 for the record changing arm is provided with means for cushioning the stopping thereof when the end of cycle of movement of the bar 26 is reached.

Referring particularly to Figs. 2, 18, and 23, the carriage is mounted on the guide rods 28 and 29, with a cylindrical sleeve 274 being placed between the shaft 28 and the carriage, the sleeve 274 being slidable on the shaft. A pair of ribs 275 and 276 (Fig. 2) extend downwardly from the carriage and are arranged with cushioning springs 277 and 278 to provide resiliency for the stopping thereof.

If desired, suitable locking means may be provided to prevent movement of the record magazine, while the record changing mechanism is picking up the record.

Referring now to Figs. 23, 24 and 25, a notched bar 279 is attached to the magazine in any suitable manner. Locking bars 280 and 281 may then be arranged for insertion in the notches of the notched bar, thus locking the magazine against vertical movement.

The locking bar 280 (Fig. 25) is provided with a slot 282 receiving a pin 283 and secured to a lever 284, which in turn is moved by the pin 285 attached to the member 246. Thus when the rollers are moved inwardly towards the record, the locking is released.

The other locking bar 281 is pivotally mounted at 286 and is controlled by the spring 287 and the dog 288.

The selector mechanism E is driven through the gears 234 and 239 by the movement of the record magazine A. The shaft 240, upon which the gear 239 is mounted, is supported in suitable bearings and extends through the entire selector mechanism. Rotatably mounted on this shaft is a notched disk 289 (Figs. 26 and 27), which is secured to a cylindrical sleeve 290 carrying at its other end the ratchet wheel 291. The frame 292 of the mechanism supports a stop member 293 which extends upwardly adjacent the ratchet wheel 291. Another ratchet wheel 294 is fixedly mounted on the shaft 240 immediately adjacent the ratchet 291.

Referring now to Fig. 31, the ratchet 294 carries a pair of pawls 295 and 296, the pawl 295 being provided with a slot 297 receiving a pin 298. Springs 299 and 300 continuously urge the pawls into engagement with the ratchet 291. The pawl 295 also carries a laterally extending lug 301 which is adapted to engage the stop member 293.

A plate 302 (Fig. 30), pivotally mounted on the frame 292, is equipped at its upper end with a dog 303 adapted to engage the ratchet 294. To the plate 302 is attached a second plate 304, provided with a dog 305 at its upper end, adapted to engage the notched disk 289. The plate 304 is pivotally supported on the plate 302 by the pin 306.

When the shaft 240 is rotated in a clockwise direction as seen in Fig. 31, the ratchet 294 being fixedly mounted thereon, rotates with the shaft. The ratchet 291, being frictionally engaged by the pawls 295 and 296, is also rotated as is the notched disk 289. When, however, the lug 301 engages the stop member 293, the pawl 295 and the ratchet 291 are held stationary, while the ratchet 294 continues to rotate as the pin 298 moves in the slot 297. When the end of the slot is reached (Fig. 31), movement of the ratchet 294 is also stopped.

When the direction of rotation of the shaft 240 is reversed, the ratchets 291 and 294 and the disk 289 rotate together until the dog 305 falls into the notch in the disk 289. At this point, the plate 304 is permitted to move so that the dog 303 engages the ratchet 294, stopping the rotation of the mechanism.

In this manner, with the ratchet 294 moving one notch more than the disk 289, the ratchet 294 is advanced one notch by each cycle of rotation. Accordingly, the magazine table controlled by this mechanism has its cycle of movement changed by one step per cycle, and the records are played successively in sequence.

The selector mechanism includes a plurality of keys and pawls illustrated in Figs. 28 and 29, as well as in Figs. 27, 30, 31, and 32.

The keys 306 are secured to the ends of levers 307 pivotally mounted on the shaft 308. The upward extension 309 of the lever 307 engages a ball bearing 310 urged downwardly by a spring 311 in a housing 312. In order for the lever to be moved, it is necessary that the end of the extension 309 shall force the ball bearing into the housing 312. This mechanism, therefore, provides a lock which prevents accidental movement of the keys.

The shaft 308 serves as a pivotal support for a pair of brackets 313 which carry a rod 314 between them. The rod 314 extends immediately beneath the rear portion 315 of the lever extension 309 and is engaged by the lever extension when the key 306 is moved to downward position.

At the end of the shaft 308 adjacent the gear 239 the bracket 313 is provided with an enlongated extension 316 (Figs. 30 and 32) which engages a laterally projecting lug 317 on the plate 304. When the rod 314 is moved downwardly, the extension 316 moves upwardly to engage the lug 317 and move the plate 304 to the position shown in dotted outline in Fig 32, in which position the dog 305 does not engage the notched disk 289, and the dog 303 on the plate 302 rides on the ratchet 294.

A second extension 317a of the bracket 313 normally engages one end 318 of the lever 319 pivotally mounted on the shaft 320. The other end of the lever has attached thereto a lug 321, which, when the lever 319 is engaged by the extension 317a, is above the top of the plate 302. However, when the extension 317a is raised, the lever 319 is permitted to pivot around the shaft 320 and the extension 321 falls to a position where it can engage the plate 302 and prevent the dog 303 from contacting the ratchet 294.

Referring to Figs. 28 and 29, the lever 307 carries at its end, opposite the key 306, a pawl 322 which is provided with an upwardly extending dog 323 and a pair of projections 324a and 325. When the key 306 is lowered, the dog 323 is raised to the point where it will engage the lug 324 on the shaft 240. A horizontally extending bar 341 is attached at its ends to small shafts 320 which are journaled in the bearing 327, and carries at one end a small arm 328 (Fig. 26) and a weighted roller 329, which maintain the bar in the position shown in Figs. 28 and 29.

When the lug 324 strikes the dog 323, the pawl 322 is moved so that the projection 324a engages the bar 341, rotating it about the shaft 320 and raising the lug 321 above the plate 302. The dog 303 of the plate 302 is then permitted to engage the ratchet 294 and stop the movement of the mechanism.

The movement of the pawl 322 to engage the bar 341 causes the projection 325 to extend forwardly under the flat plate 330. The flat horizontal plate 330 is carried by a pair of brackets 331 pivotally mounted at 332 and acts as a release plate for the keys 306.

At the end of each cycle of rotation of the phonograph, the lever 268 is moved downwardly, carrying with it the release plate 330 (Fig. 21). When the plate 330 moves downwardly, it engages the projection 325 of the pawl 322 and forces the lever 307 to the position shown in Fig. 28. A spring 331a, secured to the lever 307 and the pawl 322, is caused to exert tension when the pawl 322 is moved to the position shown in Fig. 29.

When a chosen key 306 is moved downwardly, indicating the record which it is desired to play, the pawl 322 is moved to the position shown in Fig. 29. In this position, the projection 323 will be engaged by the lug 324 at a certain point in the rotation of the shaft 240, releasing the extension lug 321 from the plate 302 and permitting the dog 303 to engage the ratchet 294 at this point. The stopping of the rotation of the ratchet in turn stops the movement of the shaft 240 and the record magazine A, thus determining the record to be played.

The lugs 324 are arranged on the shaft 240 in such a manner that one of the lugs corresponds with each of the shelves 186 in the magazine. The lugs are spaced around the shaft in such a manner that when a record is chosen to be played and the key 306 for the record is depressed, the appropriate lug 324 does not engage the projection 323 on the pawl 322 until the selector mechanism has reached a point in its rotation which will cause the magazine to be stopped with the proper shelf 186 in alignment with the turntable 20.

As seen in the circuit diagram shown in Fig. 34, a power inlet 360 for the apparatus leads to a fuse box 361 and then to the main switch 362 controlling the synchronous driving motor 136. Said motor 136 is arranged to operate continuously while the phonograph is in use. The switch 104, shown also in Figs. 4 and 10, also controls the operation of the motor 136.

The motor circuit is also provided with a fuse 369 and a manually operated switch 370. In the same circuit is the carry-over switch 183 by means of which the magazine 16 may be stopped at the top of its cycle of movement. A set-back switch 178 in cooperation with the solenoid 365 controls the clearance of the coin-controlled mechanism (not shown).

A suitable transformer 366 may, if desired, be provided for the coin-controlled mechanism. Other conventional coin-controlled mechanism such as coin chutes (not shown) controlled by switches 367 and solenoids 368 for the usual ratchets (not shown) may be provided.

Any suitable reproducing mechanism may be used with the phonograph. In the circuit diagram of Fig. 34, an amplifier 371 is shown diagrammatically in a circuit with a volume control 372, a switch 373 for controlling the field coil on a dynamic speaker and a pick-up mechanism 374.

*Operation*

To operate the phonograph, a coin is inserted in the coin slot 14 and operates the usual coin-controlled mechanism to close the electrical circuit and set the motor 136 in operation. The motor drives the pulley 140 and, through the worm gear 143, the large gear 174 and the main drive shaft 144. On the drive shaft 144 are the cams 145, 156, 157 and 164, all of which are rotated by the movement of the shaft.

The cam 164 engages the roller 165 and raises the vertical bar 182, rotating the shaft 173. The magazine 16, with its shelves of records, is moved upwardly by the bar 210 connected to the shaft 173. The movement of the magazine and the rack 233 attached thereto causes rotation of the gear 234 and the shaft 240.

The movement of the magazine continues until the roller 165 passes the peak of the cam 164, and the magazine reaches the top of its cycle of movement. Thereafter, the magazine moves downwardly, and the gear 234, shaft 240 and ratchet 294 rotate until the dog 303 engages the ratchet. This prevents further downward movement of the magazine and fixes it in position with the proper record in alignment with the record changing mechanism.

The cam 145, by moving the lever 149, causes rotation of the shaft 155 and releases the fingers 253. When the fingers are released, the rollers 32, 33, 34 and 35 move inwardly into engagement with the record, lifting the same above the projections 187 and 188 on the magazine shelf. At the same time, the cam 157 has engaged the roller 158 to cause upward movement of the lever 176 and rotation of the shaft 25.

As a result, the bar 26 begins its movement across the apparatus with the rollers in the carriage supporting the record. This movement continues until the turntable 20 is reached, the retractable pin 121 of the turntable in the meantime having been lowered by the action of the shaft 155 and the arm 125. The pin 121 is then raised and the record released by the rollers 32, 33, 34, and 35. The pin 121 acts to center the record and fix it in proper position on the turntable.

The cam 110 in the meanwhile has rotated until the roller 109 has reached the recess 111, moving the lever 77 upwardly and releasing the locking bar 61 as well as opening the switch 104 to stop the motor 136.

The upward movement of the lever 77 permits the rod 50 to move upwardly and the tone arm to fall slowly under its own weight until the needle 22 engages the surface of the record. The synchronous motor, which operates continuously to rotate the turntable when the phonograph is in use, causes the record to be rotated until the needle 22 has passed across the surface thereof.

As the record is played, the arm 21 moves across the same, and the arm support 40 and plate 58 are rotated. The lug 85 on plate 58 engages the end 101 of the lever 97 to move the bar 88 in a horizontal direction and bring the projection 96 into contact with the bar 107, closing the switch 104 and setting the motor 136 into operation.

The operation of the motor 136 again causes rotation of the cams 145, 156, 157 and 164. The lever 77 is moved downwardly, and the tone arm 21 is raised from engagement with the record. At the same time, the tone arm is swung back to its original position. The bar 88 is returned to its original horizontal position and released from contact with the clip 107 after the lug 81 closes the switch 104.

The rollers then move inwardly to engage the record and lift it from the turntable while the pin 121 is retracted.

The movement of the cam 156 causes the lever 176 to move downwardly and the shaft 25 to rotate, swinging the bar 26 and the carriage 27 with the record across the apparatus until the magazine shelf is reached. At this point, the fingers 253 engage the slidable assembly in the carriage to move the rollers outwardly out of engagement with the record.

The apparatus is then ready for the next cycle of operation.

Because of the construction of the selector mechanism and the fact that the ratchet 294 advances one notch farther with each cycle of operation, the records are played in sequence in the order in which they are carried by the magazine.

If a particular record is chosen by pressing downwardly the corresponding key 306, the operation of the apparatus is the same except that the ratchet 294 and hence the magazine 16 are stopped at a point which is determined by the engagement of the lug 324 with the pawl 322.

The records are arranged to be played in a predetermined sequence, the sequence corresponding to the order in which the records are stacked in the magazine. When a specific record is indicated for playing by the operator of the machine, this record is played and replaces in the sequence the record which would have next been played. After the indicated record is played, the machine will automatically continue with the predetermined sequence, playing the record which follows the replaced record in the sequence.

When a chosen record is played, the operation of the two ratchets 294 and 291 with respect to each other is exactly the same, in that the ratchet 294 again advances one step as a result of the playing of the chosen record. The effect of this operation is, therefore, to substitute the chosen record in the sequence which would otherwise be played. After the chosen record has been played, the sequence continues and the next record is played. Thus, if one chosen record is played, the sequence is continued with the omission of one record.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

I claim:

1. In a phonograph of the character described, a movable magazine adapted to carry a plurality of records therein, a turntable, and a record-changing mechanism movable between said magazine and said turntable, for successively delivering the records in said magazine to said turntable in a predetermined normal sequence, selector means for causing an indicated record to replace one of the records in the sequence and means operable to advance the magazine but one step in the sequence for each successive operation of the phonograph, regardless of whether the record delivered to the turntable upon such operation be one which has been reached in the normal sequence or one selected by actuation of said selector means, whereby the phonograph after playing a selected record will continue playing the records in said predetermined sequence with only the omission of the replaced record, said selector means including a shaft rotatable by the magazine in its movement and having a number of selector lugs serially arranged thereon, and manually controlled devices for selectively engaging said lugs to stop said shaft and said magazine at any selected position, and said magazine advancing means including a member fixedly mounted on said shaft, a member loosely mounted in relation thereto, said members being connected so that they normally move together, means for arresting the movement of said loosely mounted member near the end of a cycle of operation of the phonograph, and means for causing further movement of said fixed member to advance said shaft and the selector lugs thereon a distance sufficient to locate the next selector lug in the series in effective position, the action of said members being the same whether a selected record or the next one in the sequence be played in the cycle of operation.

2. In a phonograph of the character described, a vertically movable magazine adapted to carry a plurality of records in vertically stacked relation therein, a rotatable turntable mounted in a fixed horizontal position with respect to said magazine, and a record-changing mechanism horizontally movable between said magazine and said turntable, said mechanism being adapted to deliver the records in said magazine successively to said turntable in a predetermined normal sequence, selector means for causing an indicated record to replace one of the records in the sequence and means operable to advance the magazine but one step in the sequence for each successive operation of the phonograph, regardless of whether the record delivered to the turntable upon such operation be one which has been reached in the normal sequence or one selected by actuation of said selector means, whereby the phonograph after playing a selected record will continue playing the records in said predetermined sequence with only the omission of the replaced record, said selector means including a shaft rotatable by the magazine in its movement and having a number of selector lugs serially arranged thereon, and manually controlled devices for selectively engaging said lugs to stop said shaft and said magazine at any selected position, and said magazine advancing means including a member fixedly mounted on said shaft, a member loosely mounted in relation thereto, said members being connected so that they normally move together, means for arresting the movement of said loosely mounted member near the end of a cycle of operation of the phonograph, and means for causing further movement of said fixed member to advance said shaft and the selector lugs thereon a distance sufficient to locate the next selector lug in the series in effective position, the action of said members being the same whether a selected record or the next one in the sequence be played in the cycle of operation.

3. In a phonograph of the character described, a vertically movable magazine adapted to carry a plurality of records in vertically stacked relation therein, means, including a series of pivoted links connected with said magazine and a spring connection between the ends of said links for moving said magazine to a plurality of vertical positions, said spring-connected links tending to urge said magazine upwardly, means for locking said magazine in any of said positions, a rotatable turntable mounted in a fixed vertical position in alignment with one of the records in said magazine in each of the vertical positions of the magazine, said turntable being mounted in a fixed horizontal position with respect to said magazine, and a record-changing mechanism horizontally movable between said magazine and said turntable, said mechanism being adapted to deliver records from the magazine to the turntable and to return the same to the magazine after playing.

4. In a phonograph of the character described, equipped with a record playing mechanism, a movable magazine adapted to carry a plurality of records therein, a record-changing mechanism for delivering a record from said magazine to said playing mechanism and for returning the record to said magazine after the same is played, power means for moving said magazine to successive positions whereby the records therein are delivered to the playing mechanism in a predetermined normal sequence, selector means for causing an indicated record to replace one of the records in the sequence, and means operable to advance the magazine but one step in the sequence for each successive operation of the phonograph, regardless of whether the record delivered to the turntable upon such operation be one which has been reached in the normal sequence or one selected by actuation of said selector means, whereby the phonograph after playing a selected record will continue playing the records in said predetermined sequence with only the omission of the replaced record, said selector means including a shaft rotatable by the magazine in its movement and having a number of selector lugs serially arranged thereon, and manually controlled devices for selectively engaging said lugs to stop said shaft and said magazine at any selected position, and said magazine advancing means including a member fixedly mounted on said shaft, a member loosely mounted in relation thereto, said members being connected so that they normally move together, means for arresting the movement of said loosely mounted member near the end of a cycle of operation of the phonograph, and means for causing further movement of said fixed member to advance said shaft and the selector lugs thereon a distance sufficient to locate the next selector lug in the series in effective position, the action of said members being the same whether a selected record or the next one in the sequence be played in the cycle of operation.

5. A phonograph of the character described comprising a magazine carrying a plurality of records therein and movable to successive positions in normal sequence, automatic mechanism for successively playing the records in the magazine in a predetermined sequence corresponding to said positions of the magazine, selector means for causing an indicated record to replace one of the records in the sequence and means operable to advance the magazine but one step in the sequence for each successive operation of the phonograph, regardless of whether the record delivered to the turntable upon such operation be one which has been reached in the normal sequence or one selected by actuation of said selector means, whereby the phonograph after playing a selected record will continue playing the records in said predetermined sequence with only the omission of the replaced record, said selector means including a shaft rotatable by the magazine in its movement and having a number of selector lugs serially arranged thereon, and manually controlled devices for selectively engaging said lugs to stop said shaft and said magazine at any selected position, and said magazine advancing means including a member fixedly mounted on said shaft, a member loosely mounted in relation thereto, said members being connected so that they normally move together, means for arresting the movement of said loosely mounted member near the end of a cycle of operation of the phonograph, and means for causing further movement of said fixed member to advance said shaft and the selector lugs thereon a distance sufficient to locate the next selector lug in the series in effective position, the action of said members being the same whether a selected record or the next one in the sequence be played in the cycle of operation.

6. In a phonograph of the character described, equipped with a record-playing mechanism, a movable magazine adapted to carry a plurality of records therein, record-changing means for delivering a record from said magazine to said playing mechanism and for returning the record to said magazine after the same is played, power means for moving said magazine to successive positions whereby the records therein are delivered to the playing mechanism in a predetermined order, selective means for controlling the movement of said magazine whereby a record in the sequence may be replaced by an indicated record and means operable to advance the magazine but one step in the sequence for each successive operation of the phonograph, regardless of whether the record delivered to the turntable upon such operation be one which has been reached in the normal sequence or one selected by actuation of said selector means, whereby the phonograph after playing a selected record will continue playing the records in said predetermined sequence with only the omission of the replaced record, and manually operable means for controlling said selective means, said selector means including a shaft rotatable by the magazine in its movement and having a number of selector lugs serially arranged thereon, and manually controlled devices for selectively engaging said lugs to stop said shaft and said magazine at any selected position, and said magazine advancing means including a member fixedly mounted on said shaft, a member loosely mounted in relation thereto, said members being connected so that they normally move together, means for arresting the movement of said loosely mounted member near the end of a cycle of operation of the phonograph, and means for causing further movement of said fixed member to advance said shaft and the selector lugs thereon a distance sufficient to locate the next selector lug in the series in effective position, the action of said members being the same whether a selected record or the next one in the sequence be played in the cycle of operation.

7. In a phonograph of the character described, equipped with a record-playing mechanism and with record-changing means, a movable magazine adapted to carry a plurality of records therein, said magazine being movable to a plurality of positions, each position providing access to one of said records for said record-changing means, power means for moving said magazine successively to each of said positions whereby the records therein are engaged by said record-changing means in a predetermined normal order, selector means for causing an indicated record to replace one of the records in the sequence and means operable to advance the magazine but one step in the sequence for each successive operation of the phonograph, regardless of whether the record delivered to the turntable upon such operation be one which has been reached in the normal sequence or one selected by actuation of said selector means, whereby the phonograph after playing a selected record will continue playing the records in said predetermined sequence with only the omission of the replaced record, said selector means including a shaft rotatable by the magazine in its movement and having a number of selector lugs serially arranged thereon, and manually controlled devices for selectively engaging said lugs to stop said shaft and said magazine at any selected position, and said magazine advancing means including a member fixedly mounted on said shaft, a member loosely mounted in relation thereto, said members being connected so that they normally move together, means for arresting the movement of said loosely mounted member near the end of a cycle of operation of the phonograph, and means for causing further movement of said fixed member to advance said shaft and the selector lugs thereon a distance sufficient to locate the next selector lug in the series in effective position, the action of said members being the same whether a selected record or the next one in the sequence be played in the cycle of operation.

8. In a phonograph of the character described, equipped with a magazine for carrying a plurality of records and a record-playing mechanism, a record-changing mechanism for delivering records from said magazine to said playing mechanism and for returning the records to the magazine after playing, comprising a carrying member equipped with rollers for engaging a record on said magazine to secure the same to said member and a slidable frame on which said rollers are carried, means for urging said rollers into yielding engagement with said record, means for transporting said member to said playing mechanism, power means for operating said record-changing means, a release finger normally engaging said frame to hold said rollers out of engagement with the record, means operable by said power means for actuating said finger to release said rollers and allow the same to be moved into engagement with a record when the same is to be transferred from or to the record playing mechanism, said last mentioned means being operable by said power means when the record arrives at either the magazine or the playing mechanism to cause said finger to engage said frame and move said rollers out of engagement with the record.

9. In a phonograph of the character described, equipped with a magazine for carrying a plurality of records and a record-playing mechanism, a record-changing mechanism for delivering records from said magazine to said playing mechanism and for returning the records to the magazine after playing, comprising a supporting member movable between said magazine and said playing mechanism, carrying means mounted on said member, spring means for urging said carrying means into yielding engagement with a record on said magazine to pick up the record, means for transporting said member from said magazine to said playing mechanism, and means for releasing said carrying means when the record reaches the playing mechanism, said carrying means comprising record-engaging rollers and a horizontally movable frame supporting the same, and said release means including a pivoted member normally engaging said frame to hold said rollers out of engagement with the record, said member being operable by said record-changing mechanism to release said frame and allow the rollers to engage a record at the beginning of a transporting movement of said supporting member and to engage said frame and move the rollers out of engagement with the record at the end of each transporting movement of said supporting member.

10. In a phonograph of the character described, equipped with a magazine mechanism for carrying a plurality of records and record-playing mechanism, a record-changing mechanism for delivering records from said magazine mechanism to said playing mechanism and for returning the records to the magazine mechanism after playing, comprising a supporting member movable between a position adjacent said magazine mechanism and a position adjacent said record-playing mechanism, carrying means mounted on said member, spring means for urging said carrying means into yielding engagement with a record on the adjacent mechanism, means for transporting said member from one to the other of said mechanisms, and means for releasing said carrying means when the record carried thereby reaches the mechanism to which it is to be delivered, said carrying means comprising record-engaging rollers and a horizontally movable frame supporting the same, and said release means including a pivoted member normally engaging said frame to hold said rollers out of engagement with the record, said member being operable by said record-changing mechanism to release said frame and allow the rollers to engage a record at the beginning of a transporting movement of said supporting member and to engage said frame and move the rollers out of engagement with the record at the end of each transporting movement of said supporting member.

11. A phonograph as set forth in claim 10, wherein the carrying means includes a plurality of V-shaped rollers adapted to engage the sides of the record.

12. In a phonograph of the character described, equipped with a magazine for carrying a plurality of records and a record-playing mechanism, one of the record supports in said magazine being horizontally aligned with the record support of said playing mechanism, a mechanism for transporting records between said magazine and said playing mechanism, comprising a support member movable between said magazine and said playing mechanism, and a plurality of rollers rotatably mounted about vertical axes on said member, each of said rollers having a V-shaped groove extending around the side thereof, said rollers being positioned vertically so that a record on one of said aligned supports is in a horizontal plane below the center line of said groove and above the lower edge of the groove.

13. A phonograph of the character described comprising a movable magazine carrying a plurality of records therein, automatic mechanism for successively playing said records in a predetermined sequence, selector mechanism including an operating shaft, a series of record-selecting keys and mechanism operated by rotation of said shaft when one of said keys has been manipulated for causing an indicated record to replace one of the records in the sequence, and means including a driving element on said magazine and a driven element on said shaft, whereby movement of said magazine causes rotation of said shaft, said driven element comprising a member fixedly mounted on said shaft, a member loosely mounted in relation thereto, said members being connected so that they normally move together, means for arresting the movement of said loosely mounted member near the end of a cycle of operation of the phonograph, and means for causing further movement of said fixed member to advance said shaft and the selector lugs thereon a distance sufficient to locate the next selector lug in the series in effective position for the next operation.

14. In a phonograph of the character described, equipped with a record-playing mechanism and with record-changing means, a vertically movable magazine equipped with means for carrying a plurality of records in vertically stacked relation therein, said magazine being movable to a plurality of vertical positions, spring means urging said magazine upwardly to reduce the gravitational force thereof, cam and lever means for lifting said magazine, pawl and ratchet means for locking said magazine in any of said vertical positions, and selective means for controlling the operation of said pawl and ratchet, said selective means including a plurality of manually operable keys, each key corresponding to one of said vertical positions of said magazine, and means actuated by the movement of each key for rendering said pawl and ratchet means inoperative until the vertical position corresponding to the operated key is reached by the magazine, said selective means including an operating shaft operatively connected with said magazine, and said locking means being operatively connected to said shaft and adapted to arrest the rotation of the latter and to thus lock the same and said magazine in the selected position.

15. In a phonograph of the character described a movable magazine having shelves for a plurality of records, a turntable, means for transferring the records from said magazine to said turntable to be played and for thereafter returning the same to the magazine, means for operating said magazine to present the records to said transferring means successively in the order in which they are arranged in the magazine, and selector means for controlling the operation of said magazine operating means to cause the same to present a selected record to said record transferring means instead of the next record in the normal sequence, said magazine operating means including a device for advancing the magazine in relation to said record transferring means one step on each successive operation of the phonograph, regardless of whether the record played on such operation be one reached in said normal sequence or one selected by operation of said selector means, whereby the normal sequence is continued after the playing of a selected record with only the omission of the record in the sequence replaced by said selected record, said selector means including a shaft rotatable by the magazine in its movement and having a number of selector lugs serially arranged thereon, and manually controlled devices for selectively engaging said lugs to stop said shaft and said magazine at any selected position, and said magazine advancing means including a member fixedly mounted on said shaft, a member loosely mounted in relation thereto, said members being connected so that they normally move together, means for arresting the movement of said loosely mounted member near the end of a cycle of operation of the phonograph, and means for causing further movement of said fixed member to advance said shaft and the selector lugs thereon a distance sufficient to locate the next selector lug in the series in effective position, the action of said members being the same whether a selected record or the next one in the sequence be played in the cycle of operation.

16. In a phonograph of the character described a movable magazine having shelves for a plurality of records, a turntable, means for transferring the records from said magazine to said turntable to be played and for thereafter returning the same to the magazine, means for operating said magazine to present the records to said transferring means successively in the order in which they are arranged in the magazine, and selector means for controlling the operation of said magazine operating means to cause the same to present a selected record to said record transferring means instead of the next record in the normal sequence, said magazine operating means including a device for advancing the magazine in relation to said record transferring means one step on each successive operation of the phonograph, regardless of whether the record played on such operation be one reached in said normal sequence or one selected by operation of said selector means, whereby the normal sequence is continued after the playing of a selected record with only the omission of the record in the sequence replaced by said selected record, said device including an operating shaft, a ratchet fixedly mounted on said shaft, means coacting with said ratchet to stop the magazine, a notched disc loosely mounted on the shaft, a pawl and ratchet connection between said first-mentioned ratchet and said disc, means including a dog adapted to enter the notch in said disc and stop the rotation of the latter at a predetermined point in each operation, and a lost-motion connection between said disc and said first-mentioned ratchet, whereby the latter is caused to advance one notch of the ratchet with respect to said disc upon each operation of the phonograph.

17. In a phonograph of the character described, equipped with a record playing mechanism and with record changing means, a vertically movable magazine provided with means for carrying a plurality of records in vertically stacked relation therein, said magazine being movable to a plurality of vertical positions, pawl and ratchet means for locking said magazine in any of said vertical positions, and selective means for controlling the operation of said locking means, said selective means including a plurality of manually operable keys, each key corresponding to one of said vertical positions of said magazine, and means actuated by movement of each key for rendering said pawl and ratchet means inoperative until the vertical position corresponding to the operated key is reached by the magazine, said selective means including an operating shaft operatively connected with said magazine, and said locking means being operatively connected to said shaft and adapted to arrest the rotation of the latter and to thus lock the same and said magazine in the selected position.

18. In a phonograph of the character described, equipped with a record playing mechanism and with record changing means, a vertically movable magazine provided with means for carrying a plurality of records in vertically stacked relation therein, said magazine being movable to a plurality of vertical positions, means for locking said magazine in any of said vertical positions and selective means for controlling the operation of said locking means, said selective means including a plurality of manually operable keys, each key corresponding to one of said vertical positions of said magazine, and means actuated by movement of each key for rendering said locking means inoperative until the vertical position corresponding to the operated key is reached by the magazine, said selective means including an operating shaft operatively connected with said magazine, and said locking means being operatively connected to said shaft and adapted to arrest the rotation of the latter and to thus lock the same and said magazine in the selected position.

LAWRENCE B. BURNHAM.